(12) United States Patent
Song et al.

(10) Patent No.: US 11,347,353 B2
(45) Date of Patent: May 31, 2022

(54) METHOD OF PERFORMING HALF-SHUTTER FUNCTION USING OPTICAL OBJECT RECOGNITION AND METHOD OF CAPTURING IMAGE USING THE SAME

(71) Applicant: SAMSUNG ELECTRONICS CO., LTD., Suwon-si (KR)

(72) Inventors: Moonkyu Song, Suwon-si (KR); Seongwook Song, Suwon-si (KR); Soongeun Jang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/999,178

(22) Filed: Aug. 21, 2020

(65) Prior Publication Data
US 2021/0173499 A1 Jun. 10, 2021

(30) Foreign Application Priority Data
Dec. 5, 2019 (KR) .......................... 10-2019-0160362

(51) Int. Cl.
*G06F 3/041* (2006.01)
*G06F 3/042* (2006.01)
*H04N 5/235* (2006.01)

(52) U.S. Cl.
CPC ............ *G06F 3/042* (2013.01); *G06F 3/0412* (2013.01); *H04N 5/2353* (2013.01)

(58) Field of Classification Search
CPC ...... G06F 3/042; G06F 3/0488; G06F 3/0412; H04N 5/2353; H04N 5/232933; H04N 5/232411; H04N 5/23293; H04N 5/23212; H04N 5/23216
See application file for complete search history.

(56) References Cited

U.S. PATENT DOCUMENTS

| | | |
|---|---|---|
| 7,787,762 B2 | 8/2010 | Abe |
| 8,681,236 B2 | 3/2014 | Baek |
| 9,232,125 B2 | 1/2016 | Song |
| 9,454,230 B2 | 9/2016 | Matsuki |
| 9,521,247 B2 | 12/2016 | Bandyopadhyay et al. |
| 2010/0148922 A1* | 6/2010 | Yamada ............... G06K 9/6857 340/5.82 |
| 2014/0078041 A1* | 3/2014 | Hwang .............. H04N 5/23216 345/156 |
| 2015/0177865 A1* | 6/2015 | Rodzevski .............. G06F 3/042 345/175 |

(Continued)

*Primary Examiner* — Ryan A Lubitz
(74) *Attorney, Agent, or Firm* — Sughrue Mion, PLLC

(57) ABSTRACT

Provided is a method of performing a half-shutter function using optical object recognition, the method including: displaying a shutter button on a display panel by driving a portion of a plurality of light sources included in the display panel, the portion of the plurality of light sources being disposed corresponding to an object recognition window of the display panel; obtaining a first image based on reflected light received by an object recognition sensor through the object recognition window while driving the portion of the plurality of light sources; determining whether the first image includes a first object, the first object having a half-shutter state; and based on a determination that the first image includes the first object having the half-shutter state, performing a half-shutter process.

20 Claims, 25 Drawing Sheets

(56) References Cited

U.S. PATENT DOCUMENTS

| | | | |
|---|---|---|---|
| 2017/0017825 A1* | 1/2017 | Choi | G06K 9/00026 |
| 2017/0220838 A1 | 8/2017 | He et al. | |
| 2017/0270342 A1 | 9/2017 | He et al. | |
| 2017/0285764 A1* | 10/2017 | Kim | G03B 17/02 |
| 2019/0310724 A1* | 10/2019 | Yeke Yazdandoost | G02F 1/13338 |
| 2020/0311234 A1* | 10/2020 | Nicholson | G06F 1/1684 |

* cited by examiner

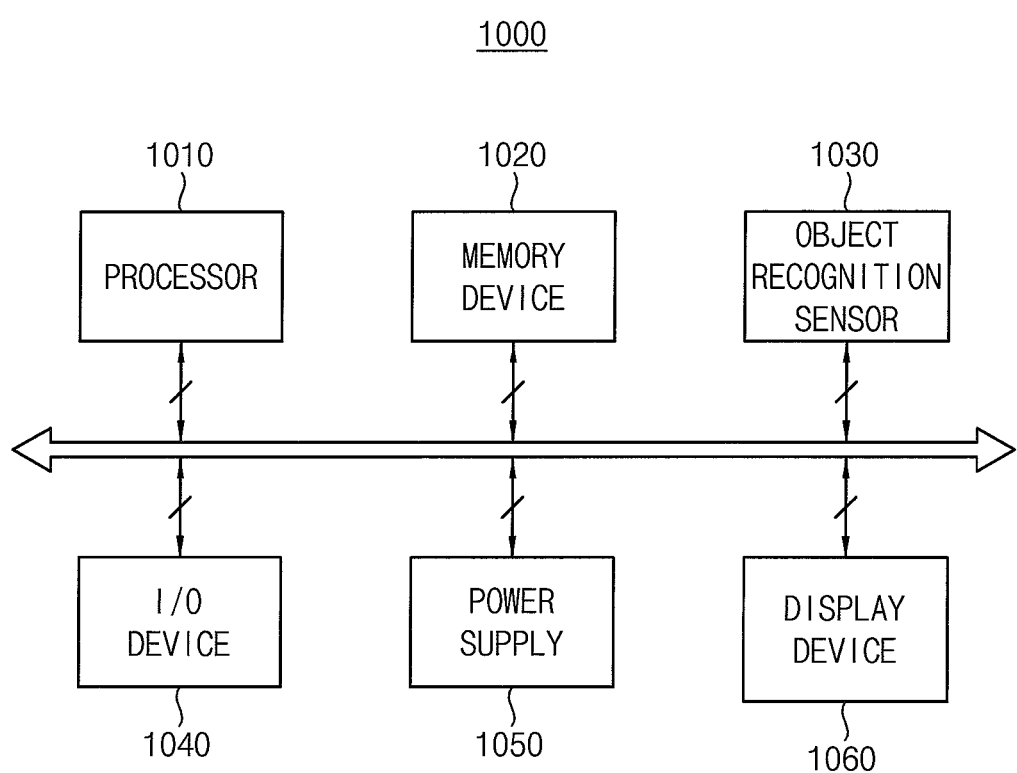

METHOD OF PERFORMING HALF-SHUTTER FUNCTION USING OPTICAL OBJECT RECOGNITION AND METHOD OF CAPTURING IMAGE USING THE SAME

CROSS-REFERENCE TO THE RELATED APPLICATION

This application claims priority under 35 U.S.C. § 119 to Korean Patent Application No. 10-2019-0160362, filed on Dec. 5, 2019 in the Korean Intellectual Property Office, the contents of which are herein incorporated by reference in their entireties.

BACKGROUND

1. Field

Example embodiments relate generally to semiconductor integrated circuits, and more particularly to methods of performing a half-shutter function using optical object recognition, and methods of capturing images using the methods of performing the half-shutter function.

2. Description of the Related Art

Recently, an electronic device (e.g., a digital single lens reflex (DSLR) camera) dedicated to image capturing and an electronic device (e.g., a smart phone) equipped with various other functions as well as an image capturing function have been widely used. The electronic device dedicated to image capturing includes a physical shutter button, and a user performs an image shooting by pressing the shutter button completely (e.g., pressing the shutter button all the way) and performs a half-shutter function by pressing the shutter button lightly (e.g., pressing the shutter button half way). In the electronic device such as a smart phone that are recently released, a physical shutter button may not be included in order to increase a size of a display and reduce a thickness of electronic device, and an image shooting is performed using a touch sensor rather than the physical shutter button. In this case, in the electronic device such as a smart phone, it is impossible to predict when a full-shutter input is provided, and there is a problem that it is difficult to provide a half-shutter input distinguished from the full-shutter input.

SUMMARY

At least one example embodiment of the disclosure provides a method of performing a half-shutter function capable of identifying a half-shutter input using optical object recognition without a physical shutter button.

At least one example embodiment of the disclosure provides a method of capturing an image using the method of performing the half-shutter function.

According to an aspect of an example embodiment, a method of performing a half-shutter function using optical object recognition is provided. In the method, a shutter button is displayed on a display panel by driving a portion of a plurality of light sources included in the display panel, the portion of the plurality of light sources being disposed corresponding to an object recognition window of the display panel. A first image is obtained based on reflected light received by an object recognition sensor through the object recognition window while driving the portion of the plurality of light sources. It is determined whether the first image includes a first object, the first object having a half-shutter state. Based on a determination that the first image includes the first object having the half-shutter state, a half-shutter process is performed.

According to an aspect of an example embodiment, a method of capturing an image is provided. In the method, a shutter button is displayed on a display panel by driving a portion of a plurality of light sources included in the display panel, the portion of the plurality of light sources being disposed to correspond to an object recognition window of the display panel. A plurality of images are continuously obtained based on reflected light received by an object recognition sensor through the object recognition window while driving the portion of the plurality of light sources. A half-shutter function is performed based on a half-shutter input, the half-shutter input being detected based on a first image among the plurality of images. An image capturing function is performed based on a full-shutter input. The performing the half-shutter function includes: determining whether the first image includes a first object, the first object having a half-shutter state; and performing a half-shutter process based on the half-shutter state of the first object included in the first image.

According to an aspect of an example embodiment, a method of performing a half-shutter function using optical object recognition is provided. In the method, an image capturing application providing an image capturing function is executed and displayed on a display panel, the display panel including a plurality of light sources. A shutter button is displayed on the display panel by driving a portion of the plurality of light sources, the portion of the plurality of light sources being disposed to correspond to an object recognition window of the display panel. Prior to receiving a full-shutter input, a plurality of images are continuously obtained based on reflected light received by an object recognition sensor through the object recognition window while driving the portion of the plurality of light sources. It is determined that a first image among the plurality of images includes a first object having a half-shutter state. A half-shutter process is performed based on the half-shutter state of the first object included in the first image. It is determined that the first image includes the first object having the half shutter-state based on a result of performing at least one of a spatial signal processing and a frequency signal processing on the first image.

BRIEF DESCRIPTION OF THE DRAWINGS

Illustrative, non-limiting example embodiments will be more clearly understood from the following detailed description taken in conjunction with the accompanying drawings.

FIG. 23 is a block diagram illustrating an electronic device according to example embodiments.

DETAILED DESCRIPTION

Figure 1:
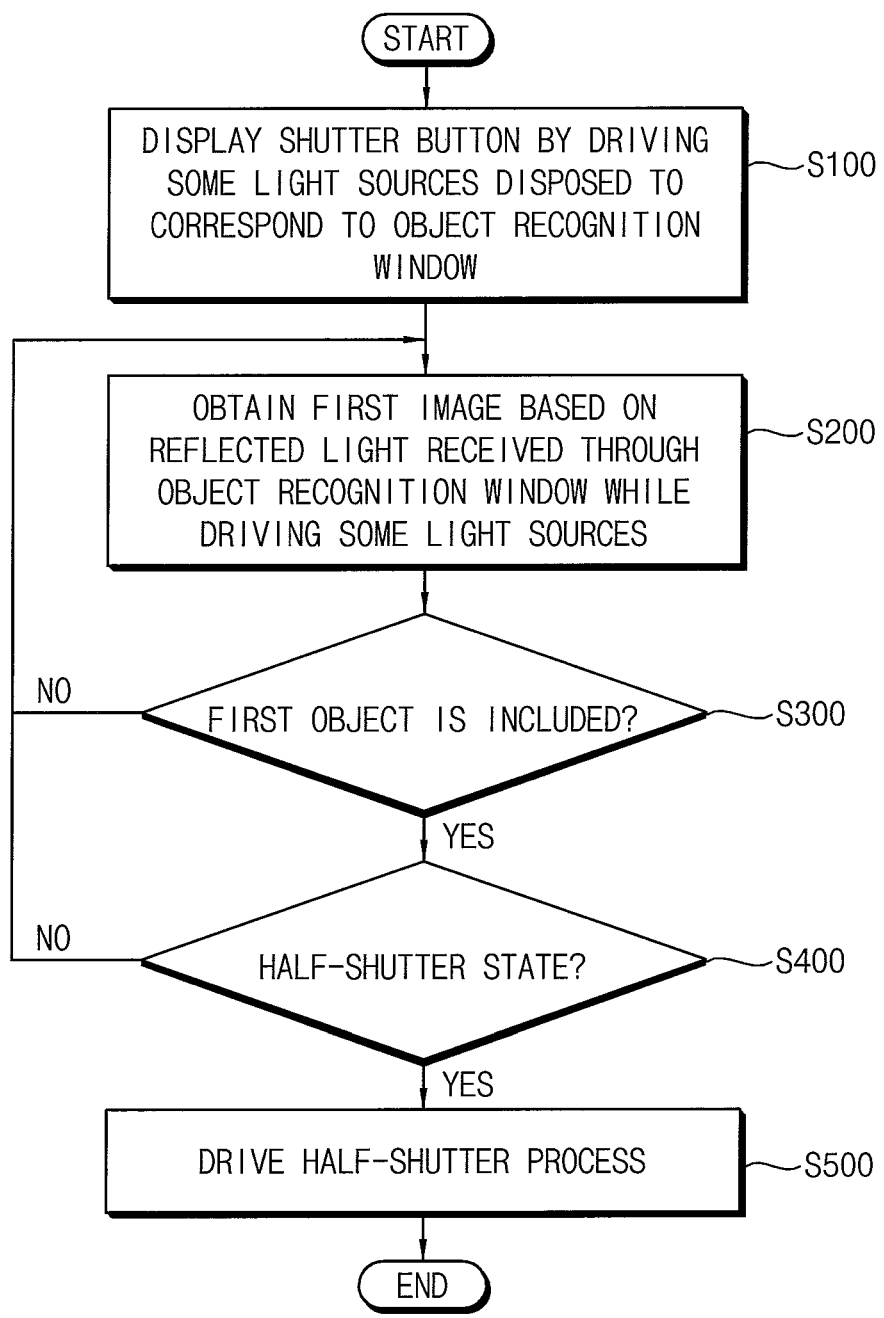
FIG. 1 is a flowchart illustrating a method of performing half-shutter function using optical object recognition according to example embodiments.

Various example embodiments will be described more fully with reference to the accompanying drawings, in which example embodiments are shown. The disclosure may, however, be embodied in many different forms and should not be construed as limited to the example embodiments set forth herein. Like reference numerals refer to like elements throughout this application.

FIG. 1 is a flowchart illustrating a method of performing a half-shutter function using optical object recognition according to example embodiments.

Referring to FIG. 1, a method of performing a half-shutter function using optical object recognition according to example embodiments may be performed by an electronic device that includes a display panel and an object recognition sensor, and the half-shutter function may be performed when the electronic device captures or shoots images. The display panel may include a plurality of light sources, and the object recognition sensor may perform the optical object recognition by using light provided by the plurality of light sources. Detailed configuration of the electronic device will be described with reference to FIGS. 2 through 5.

In the method of performing the half-shutter function using the optical object recognition according to example embodiments, a shutter button may be displayed on the display panel by driving some light sources among the plurality of light sources (or a portion of the plurality of light sources) included in the display panel (operation S100). The portion of the plurality of light sources are disposed to correspond to an object recognition window which is a partial region of the display panel. According to example embodiments, all of the portion of the plurality of light sources may emit light to have the same grayscale value, or the portion of the plurality of light sources may emit light to have different grayscale values. The shutter button is displayed on the partial region of the display panel (e.g., on the object recognition window). For example, the shutter button may be displayed together with an image capturing application, which, when executed, provides an image capturing function. In example embodiments, as will be described with reference to FIG. 20, an operation of executing the image capturing application may be performed before operation S100.

While driving the portion of the plurality of light sources, a first image may be obtained or acquired based on reflected light received by the object recognition sensor through the object recognition window (operation S200). According to example embodiments, only one piece of the first image may be obtained, or one of a plurality of images may be selected as the first image after the plurality of images are continuously obtained, as will be described with reference to FIG. 20. For example, all of the portion of the plurality of light sources may be substantially simultaneously or concurrently turned on. Light generated from the portion of the plurality of light sources may be emitted through the object recognition window and may be reflected by any object (or an arbitrary object) positioned corresponding to the object recognition window, and the reflected light may be provided to the object recognition sensor. Accordingly, the object recognition sensor may obtain an image corresponding to the object recognition window and/or the object based on the reflected light.

It is determined whether the first image includes a first object providing a full-shutter input (or a shutter input) or a half-shutter input (operation S300). When it is determined that the first image includes the first object (operation S300: YES), it is determined whether the first object in the first image has (or is in) a half-shutter state for providing the half-shutter input (operation S400). When it is determined that the first object in the first image has the half-shutter state (operation S400: YES), a half-shutter process is driven based on the half-shutter state (operation S500).

In some example embodiments, the full-shutter input may be an input for performing an image capturing (e.g., the image capturing function or process), and the half-shutter input may be an input for performing the half-shutter process associated with the image capturing before performing the image capturing. However, example embodiments are not limited thereto, and the half-shutter input may include any input that is received before the full-shutter input is received as long as the half-shutter state, distinguished from the full-shutter state, is identified.

In some example embodiments, the half-shutter process may include at least one of a focus adjustment, an exposure adjustment, a white balance adjustment, a gain adjustment, a low power consumption, and a control/command for a continuous image capturing. However, example embodiments are not limited thereto, and the half-shutter process may include at least one of various functions that are performed before an image is taken (or captured) and achieve zero shutter lag with low power consumption. For example, various functions included in the half-shutter process may be functions that not only may increase an image quality of the image to be taken by a subsequent shutter input by performing a preparation operation for the image capturing, but also may reduce power consumption by performing the preparation operation with low power consumption.

In some example embodiments, the first object may be a finger of a user including a fingerprint. In this example, the object recognition window and the object recognition sensor may be a fingerprint recognition window and a fingerprint recognition sensor, respectively. However, example embodiments are not limited thereto, and the first object may be one of various objects of which the full-shutter input and the half-shutter input may be distinguished, identified, and/or recognized, such as a gloved finger, an object including a specific pattern, or the like.

When the first image does not include the first object (operation S300: NO), or when the first object in the first image does not have (or is not in) the half-shutter state (operation S400: NO), the half-shutter process may not be driven, and operations S200, S300 and S400 may be repeatedly performed until an image including the first object having the half-shutter state is obtained.

In the method of performing the half-shutter function according to example embodiments, the half-shutter input for performing the half-shutter process may be provided or identified before the shutter button is pressed, by detecting a certain situation based on the object recognition sensor and the optical object recognition and by recognizing the certain situation as the half-shutter state. Accordingly, the half-shutter input may be efficiently identified without an input through a physical shutter button, and the zero shutter lag may be efficiently achieved with low power consumption by performing various functions (e.g., the focus adjustment, the exposure adjustment, the gain adjustment, controls/commands for the continuous image capturing, etc.) before taking an image, without reducing the size of the display in the electronic device and/or increasing the thickness of the electronic device, in order to provide the physical shutter button. Therefore, the half-shutter function according to example embodiments may be provided while the size of display increases and the thickness of device decreases.

Figure 2:
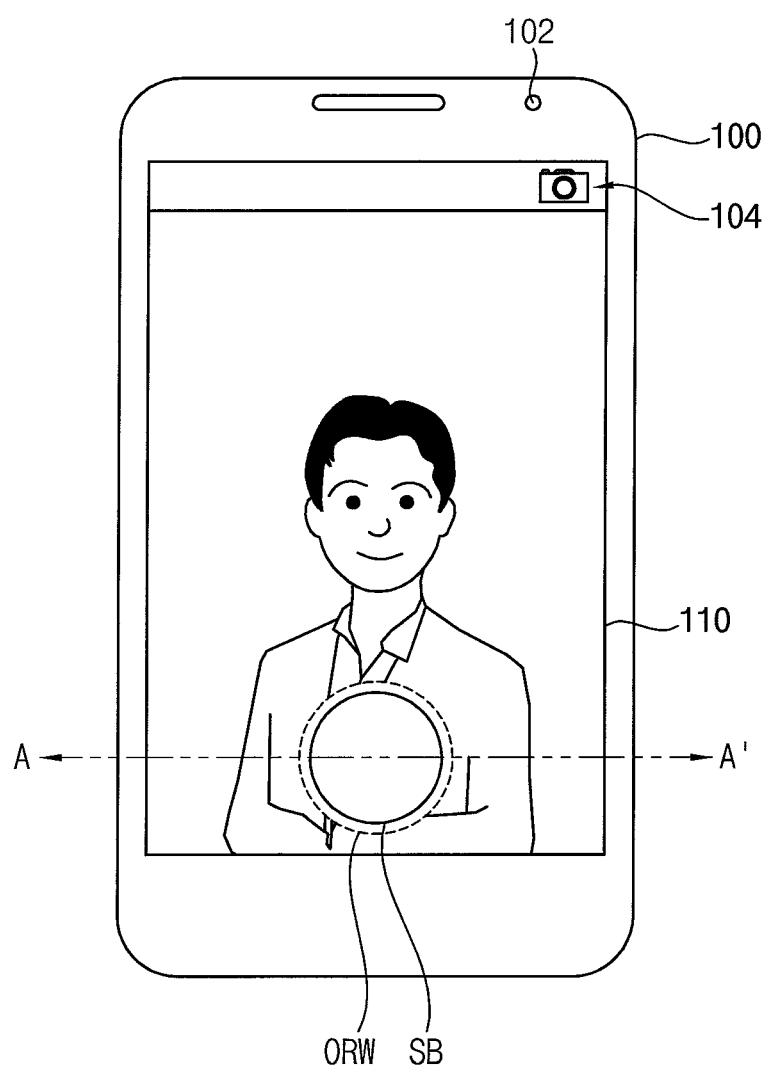
FIG. 2 is a plan view of an electronic device according to example embodiments.

FIG. 2 is a plan view of an electronic device according to example embodiments.

Referring to FIG. 2, an electronic device 100 includes a panel 110 to interface with a user. The user of the electronic device 100 may view information output from the electronic device 100 through the panel 110. The user of the electronic device 100 may input a signal or a command to the electronic device 100 through the panel 110. For example, the panel 110 may include a display panel configured to output visual information to the user, a touch sensor panel configured to sense a touch input of the user, and/or the like.

An object recognition window ORW may be provided on the panel 110. As will be described with reference to FIGS. 3A and 3B, an object recognition sensor to detect an object may be disposed to spatially correspond to a location of the object recognition window ORW. Although the object recognition window ORW is illustrated as a circle in FIG. 2 or a rectangle in other figures, a shape of the object recognition window ORW may be variously changed according to example embodiments.

In addition, the electronic device 100 may include an image capturing module 102 (e.g., a camera module or a camera). When an image capturing application 104 (e.g., a camera application) is executed, image information of an object (e.g., a person) received through the image capturing module 102 may be displayed on the panel 110 (e.g., on the display panel), and a shutter button SB may be displayed at a location corresponding to the location of the object recognition window ORW. Although FIG. 2 illustrates that one image capturing module 102 is disposed on the front surface of the electronic device 100, example embodiments are not limited thereto, and a plurality of image capturing modules may be disposed on at least one of the front and back surfaces of the electronic device 100.

In some example embodiments, the full-shutter input described with reference to FIG. 1 may be provided or received based on a scheme of sensing a touch input of the user to the shutter button SB using the panel 110 (e.g., the touch sensor panel) or a scheme of identifying an object on the object recognition window ORW using the object recognition sensor.

In some example embodiments, the half-shutter input described with reference to FIG. 1 may be provided or received based on the scheme of identifying the object on the object recognition window ORW using the object recognition sensor. The half-shutter input may represent an action that is performed before the full-shutter input is provided or received. It may be efficient for the user to use the shutter button SB to provide the full-shutter input, which may be similar to user experience in using an existing camera shutter button (e.g., a physical camera shutter button). Since the shutter button SB is illuminated to indicate its location on the display panel, the user may experience the same experience as an existing camera interface.

In some example embodiments, the electronic device 100 may include any mobile system, such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Example embodiments may provide an interface that may be used to detect an object. For example, a function of detecting a finger or a fingerprint may be performed when the user contacts or approaches the panel 110. According to example embodiments, the interface and the object recognition sensor used for the object detection may share an area on the electronic device 100 with the panel 110 (e.g., an area on the panel 110 may be used as the interface and the objection recognition sensor), and thus the interface and the object recognition sensor may not require an additional area on the electronic device 100. Accordingly, it may be possible to reduce the size of the electronic device 100, or a spare area may be used for other purpose(s).

Figure 3A:
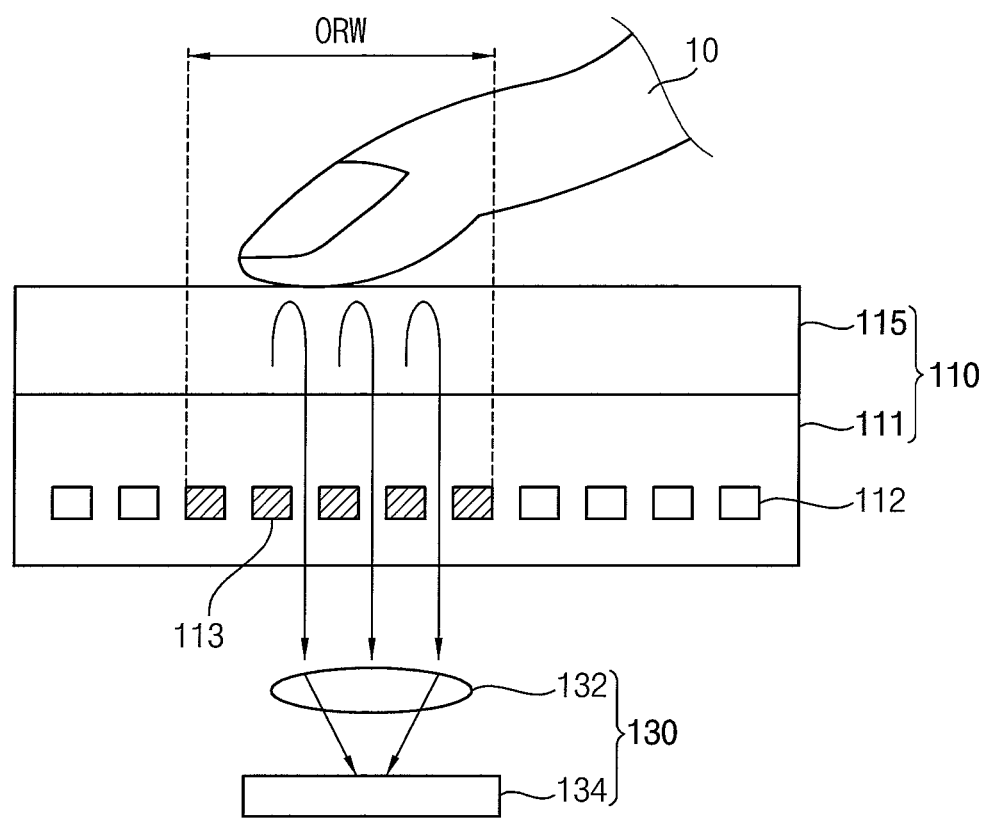
FIGS. 3A and 3B are cross-sectional views of an example of the electronic device taken along a line A-A' of FIG. 2.
Figure 3B:
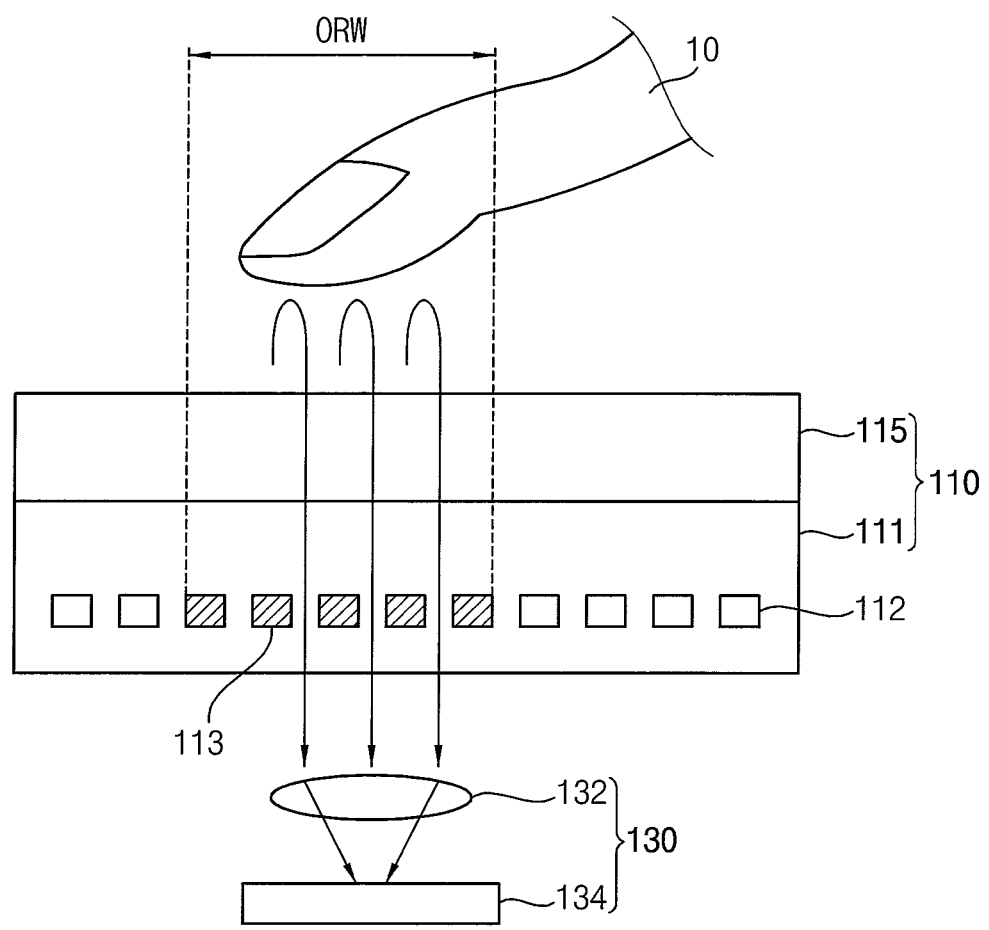

FIGS. 3A and 3B are cross-sectional views of an example of the electronic device taken along a line A-A' of FIG. 2.

Referring to FIGS. 3A and 3B, the object recognition window ORW may be displayed on a partial region (or portion) of the panel 110 in an object recognition mode. For example, as described with reference to FIG. 2, when the image capturing application 104 is executed, the object recognition window ORW for identifying the full-shutter input and/or the half-shutter input may be displayed, and the shutter button SB may be displayed together, at a location corresponding to the location of the object recognition window ORW.

The panel 110 may include a display panel 111 and a touch sensor panel 115.

The display panel 111 may include a plurality of light sources 112. For example, as will be described with reference to FIGS. 4 and 5, the plurality of light sources 112 may be included in a plurality of pixels included in the display panel 111. Among the plurality of light sources 112, only a portion of the plurality of light sources 113 that are disposed to correspond to the object recognition window ORW may be driven substantially simultaneously in the object recognition mode. In FIGS. 3A and 3B, the portion of the plurality of light sources 113 that are driven and emit light are represented by hatched parts.

An object recognition sensor 130 may be disposed under the panel 110 such that the object recognition sensor 130 may overlap the object recognition window ORW in a vertical direction. In other words, the panel 110 may include a first surface on which an image is displayed and a second surface opposite to the first surface, and the object recognition sensor 130 may be disposed under the second surface of the panel 110.

The object recognition sensor 130 may include a lens 132 and an image sensor 134. The lens 132 may be disposed under the panel 110 (e.g., disposed between the panel 110 and the image sensor 134), and may concentrate reflected light received through the object recognition window ORW on the image sensor 134. The image sensor 134 may be disposed under the lens 132, and may generate an image signal for an object on the partial region based on the reflected light concentrated by the lens 132. In some example embodiments, the lens 132 may be omitted in the object recognition sensor 130.

For example, in a case of fingerprint detection where a user places a finger 10 on the object recognition window ORW as illustrated in FIG. 3A, light generated from the portion of the plurality of light sources 113 within the object recognition window ORW may be reflected by a fingerprint of the finger 10, and reflected light of the fingerprint may be provided to the object recognition sensor 130. The object recognition sensor 130 may capture an image signal for the fingerprint or information associated with a shape of the fingerprint (e.g., a fingerprint image) based on the reflected light of the fingerprint received through the object recognition window ORW.

In another example, in a first case where the user directly contacts the finger 10 to the object recognition window ORW as illustrated in FIG. 3A, or in a second case where the finger 10 is spaced apart a certain distance from the object recognition window ORW as illustrated in FIG. 3B, reflected light, which is generated from the portion of the plurality of light sources 113 and is reflected by the finger 10, in the first case may be different from reflected light, which is generated from the portion of the plurality of light sources 113 and is reflected by the finger 10, in the second case, and thus an image signal of the finger 10 captured by the object recognition sensor 130 in the first case may be different from an image signal of the finger 10 captured by the object recognition sensor 130 in the second case. The full-shutter input and the half-shutter input may be distinguished and recognized by identifying the above-described differences. For example, the first case of FIG. 3A may be recognized as the full-shutter input, and the second case of FIG. 3B may be recognized as the half-shutter input.

Although not illustrated in FIGS. 3A and 3B, the object recognition sensor 130 may further include a filter for adjusting a frequency characteristic and/or a polarization characteristic of the reflected light which is to be provided to the image sensor 134.

Figure 4:
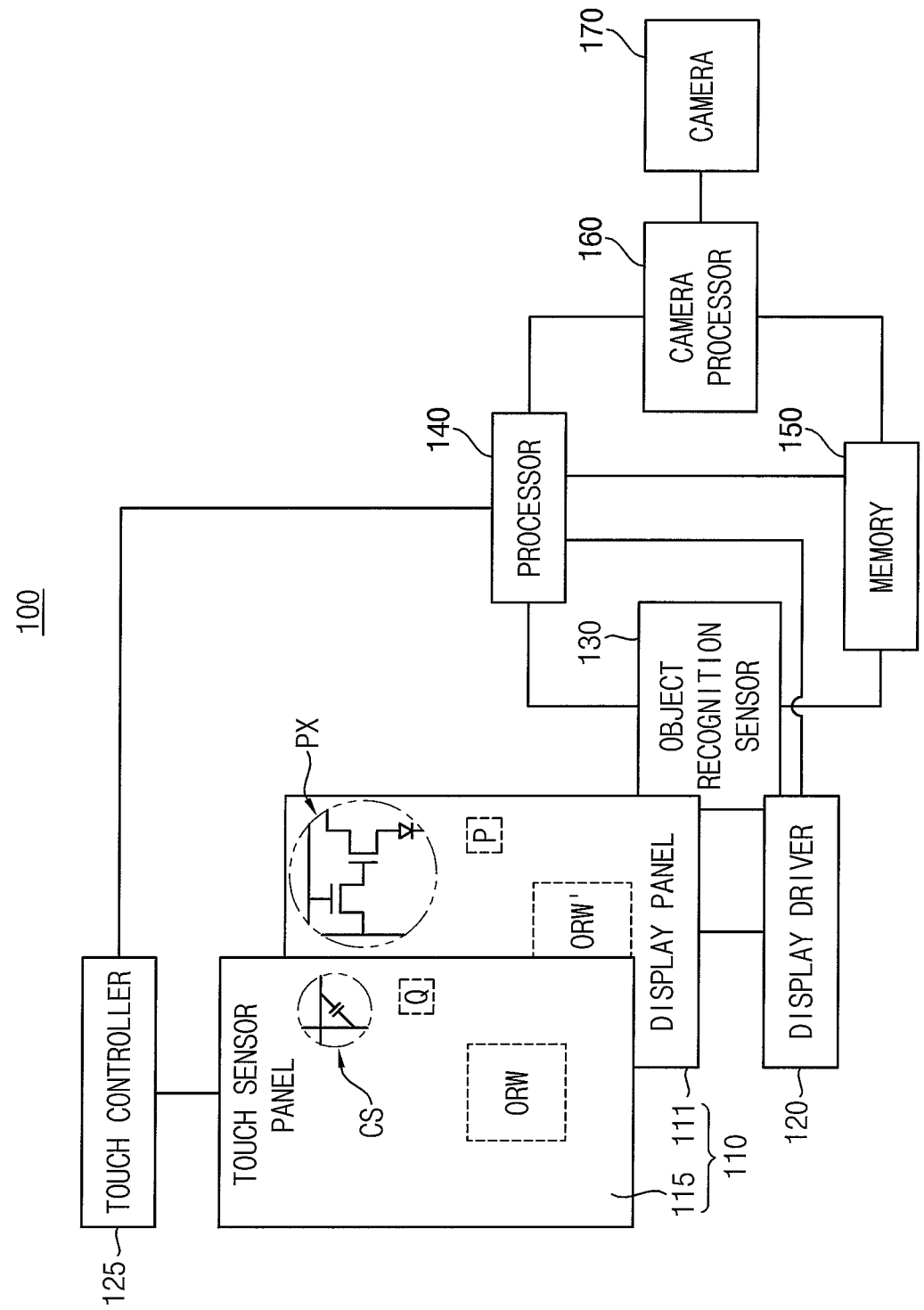
FIGS. 4 and 5 are block diagrams illustrating examples of the electronic device of FIG. 2.
Figure 5:
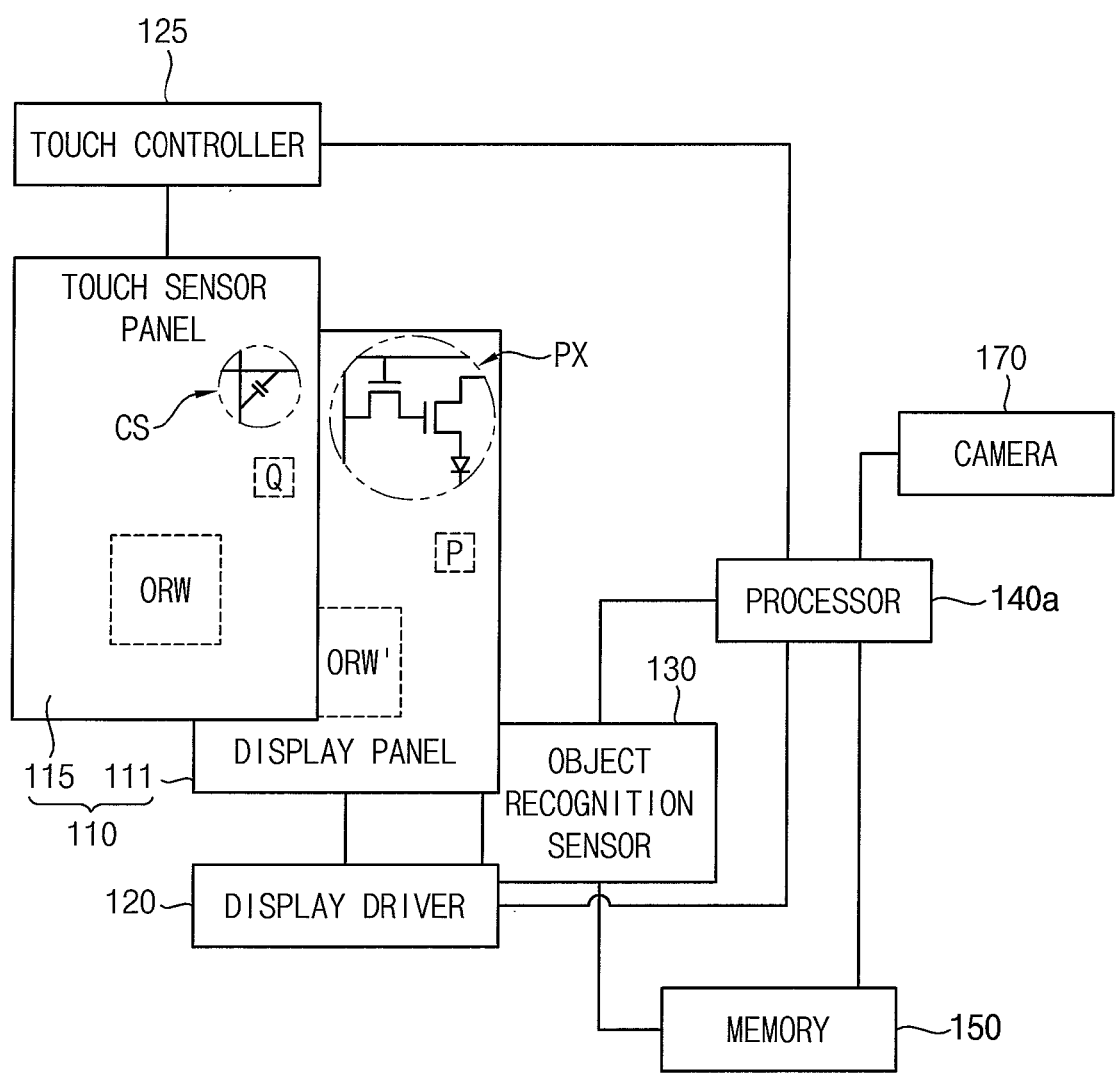

FIGS. 4 and 5 are block diagrams illustrating examples of the electronic device of FIG. 2.

Referring to FIG. 4, the electronic device 100 includes the panel 110 and the object recognition sensor 130. The panel 110 may include the display panel 111 and the touch sensor panel 115. The electronic device 100 may further include a display driver 120, a touch controller 125, a processor 140, a memory 150, a camera processor 160 and a camera 170.

The touch sensor panel 115 may sense contact or proximity of an object (e.g., a finger of the user) to the touch sensor panel 115. The touch sensor panel 115 may generate a sensing signal in response to the contact or proximity of the object. The touch sensor panel 115 may include a plurality of sensing capacitors which are formed along rows and columns. FIG. 4 illustrates one example sensing capacitor CS. Capacitance values of the sensing capacitors may vary in response to the contact or proximity of the object.

The touch controller 125 may control operations of the touch sensor panel 115. The touch controller 125 may process an operation associated with the contact or proximity of the object based on a sensing signal output from the touch sensor panel 115. For example, the touch controller 125 may recognize the contact or proximity of the object based on variation in the capacitance values of the sensing capacitors. For example, when the sensing signal is associated with execution or operation of a specific application, the touch controller 125 may output a command to the processor 140 such that the specific application is to be executed or to operate.

The display panel 111 outputs visual information to the user. The display panel 111 may include a plurality of pixels which are arranged along rows and columns to display an image. FIG. 4 illustrates one example pixel PX. Each pixel may be configured to emit light of a specific color which forms the image. As the plurality of pixels emit light together, the display panel 111 may display a desired or intended image.

In some example embodiments, the display panel 111 may be an electroluminescent display panel. The electroluminescent display panel may be driven with rapid response speed and low power consumption using a light emitting diode (LED) or an organic light emitting diode (OLED) that generates light by recombination of electrons and holes. In comparison with a liquid crystal display panel using a backlight unit, pixels of the electroluminescent display panel may emit light by themselves, and the reflected light received through the object recognition window ORW on the touch sensor panel 115 (or an object recognition window ORW' on the display panel 111) may be provided to the object recognition sensor 130 under the display panel 111 through a space (or gap) between the pixels. Thus, light emitting diodes or organic light emitting diodes included in the pixels may correspond to the light sources included in the display panel according to example embodiments. However, example embodiments are not limited thereto, and the display panel 111 may be any display panel having a structure in which the reflected light received through the object recognition window ORW or ORW' may be provided to the object recognition sensor 130.

The display driver 120 may control operations of the display panel 111 and may drive the display panel 111. For example, the display driver 120 may suitably drive each pixel of the display panel 111 in response to a command of the processor 140 such that the desired or intended image is displayed on the display panel 111. For example, the display driver 120 may partially drive the display panel 111 such that pixels corresponding to the object recognition window ORW' emit light. Although not illustrated in FIG. 4, the display driver 120 may include a data driver, a scan driver, a timing controller, a gamma circuit, etc.

A coordinate on the touch sensor panel 115 may be matched with a corresponding coordinate on the display panel 111. For example, the display panel 111 may display interface information on a specific area P. The user may contact or approach a specific area Q on the touch sensor panel 115 to input a command through the displayed interface information. Herein, a coordinate of the specific area Q may be matched with a coordinate of the specific area P. Accordingly, contact or proximity on or to the specific area Q may be processed in association with interface information displayed on the specific area P.

In some example embodiments, the touch sensor panel 115 may be implemented separately from the display panel 111. For example, as illustrated in FIG. 4, the touch sensor panel 115 may be placed on or over the display panel 111. However, example embodiments are not limited thereto. In another example, unlike that illustrated in FIG. 4, the display panel 111 may be placed on or over the touch sensor panel 115. Alternatively, the touch sensor panel 115 and the display panel 111 may be implemented in one single panel.

The object recognition sensor 130 may be used to detect an object. The object recognition sensor 130 may generate/output an image signal associated with the object which is on the object recognition window ORW. For example, the object recognition sensor 130 may operate to obtain an image signal associated with a finger (or fingerprint) which contacts or approaches the object recognition window ORW. As described with reference to FIGS. 3A and 3B, the object recognition sensor 130 may include the lens 132 and the image sensor 134. In some example embodiments, the lens 132 may be omitted.

The object recognition sensor 130 may provide a function of optical object recognition or optics-based object detection. For example, the image sensor 134 included in the object recognition sensor 130 may include photo-diode(s) which is capable of generating current in response to light.

As described with reference to FIG. 2, the object recognition window ORW may be provided on the panel 110, for example, on the touch sensor panel 115. In addition, the object recognition window ORW' may be provided on the display panel 111 to correspond to the object recognition window ORW. The object recognition sensor 130 may be disposed under the display panel 111 to spatially correspond to a location of the object recognition window ORW and a location of the object recognition window ORW'.

In some example embodiments, the location of the object recognition window ORW may be associated with coordinates on the touch sensor panel 115, and the location of the object recognition window ORW' may be associated with coordinates on the display panel 111. In addition, the location and a size of each of the object recognition windows ORW and ORW' may be modified or changed depending on the arrangement of the object recognition sensor 130.

The processor 140 may control overall operations of the electronic device 100. The processor 140 may process/perform various arithmetic/logical operations to provide functions of the electronic device 100.

The processor 140 may communicate with the display driver 120, the touch controller 125, the object recognition sensor 130 and the memory 150. The processor 140 may control operations of the display driver 120, the touch controller 125, the object recognition sensor 130 and the memory 150. The processor 140 may process commands, requests, responses, and/or the like, which are associated with operations of the display driver 120, the touch controller 125, the object recognition sensor 130 and the memory 150.

For example, the processor 140 may process a command received from the touch controller 125 according to a user command input through the touch sensor panel 115. For example, the processor 140 may provide a variety of information to the display driver 120 to display the desired or intended image on the display panel 111. For example, the processor 140 may control an operation timing and/or sequence of the display panel 111 and the object recognition sensor 130 such that the object recognition sensor 130 generates signals associated with the object image. For example, the processor 140 may generate and analyze information associated with the object image based on the signals output from the object recognition sensor 130. For example, the processor 140 may store associated data in the memory 150 or may load the associated data from the memory 150.

In some example embodiments, the processor 140 may include one or more special-purpose circuits (e.g., a field programmable gate array (FPGA), application specific integrated chips (ASICs), and/or the like) to perform various operations. For example, the processor 140 may include one or more processor cores which are capable of performing various operations. For example, the processor 140 may be implemented with a general-purpose processor, a special-purpose processor, or an application processor.

The memory 150 may store data associated with or related to the operation of the electronic device 100. For example, the memory 150 may store various data for performing the method of performing the half-shutter function according to example embodiments.

In some example embodiments, the memory 150 may include at least one of various volatile memories such as a dynamic random access memory (DRAM), a static random access memory (SRAM), or the like, and/or at least one of various nonvolatile memories such as a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), or the like.

The camera 170 may correspond to the image capturing module 102 in FIG. 2, and may perform an image capturing function. For example, the camera 170 may include an image sensor, a lens, and the like. The camera processor 160 may control an operation of the camera 170. For example, the camera processor 160 may perform the half-shutter process when receiving the half-shutter input.

In some example embodiments, the display driver 120, the touch controller 125, the object recognition sensor 130, the processor 140, the memory 150, the camera processor 160 and the camera 170 may be respectively implemented with separate circuits/modules/chips. In other example embodiments, based on a function, some of the display driver 120, the touch controller 125, the object recognition sensor 130, the processor 140, the memory 150, the camera processor 160 and the camera 170 may be combined into one circuit/module/chip, or may be further separated into a plurality of circuits/modules/chips.

The electronic device 100 may perform the method of performing the half-shutter function according to example embodiments described with reference to FIG. 1. For example, the display panel 111 and the display driver 120 may perform operation S100 in FIG. 1, the object recognition sensor 130 may perform operation S200 in FIG. 1, the processor 140 may perform operations S300 and S400 in FIG. 1, and the camera processor 160 may perform operation S500 in FIG. 1. In addition, the electronic device 100 may perform methods of performing half-shutter function which will be described with reference to FIGS. 18 and 19 and/or a method of capturing an image which will be described with reference to FIG. 20.

Referring to FIG. 5, an electronic device 100a of FIG. 5 may be substantially the same as the electronic device 100 of FIG. 4, except that the electronic device 100a includes one processor 140a in which the processor 140 and the camera processor 160 in FIG. 4 are integrated or merged.

Figure 6:
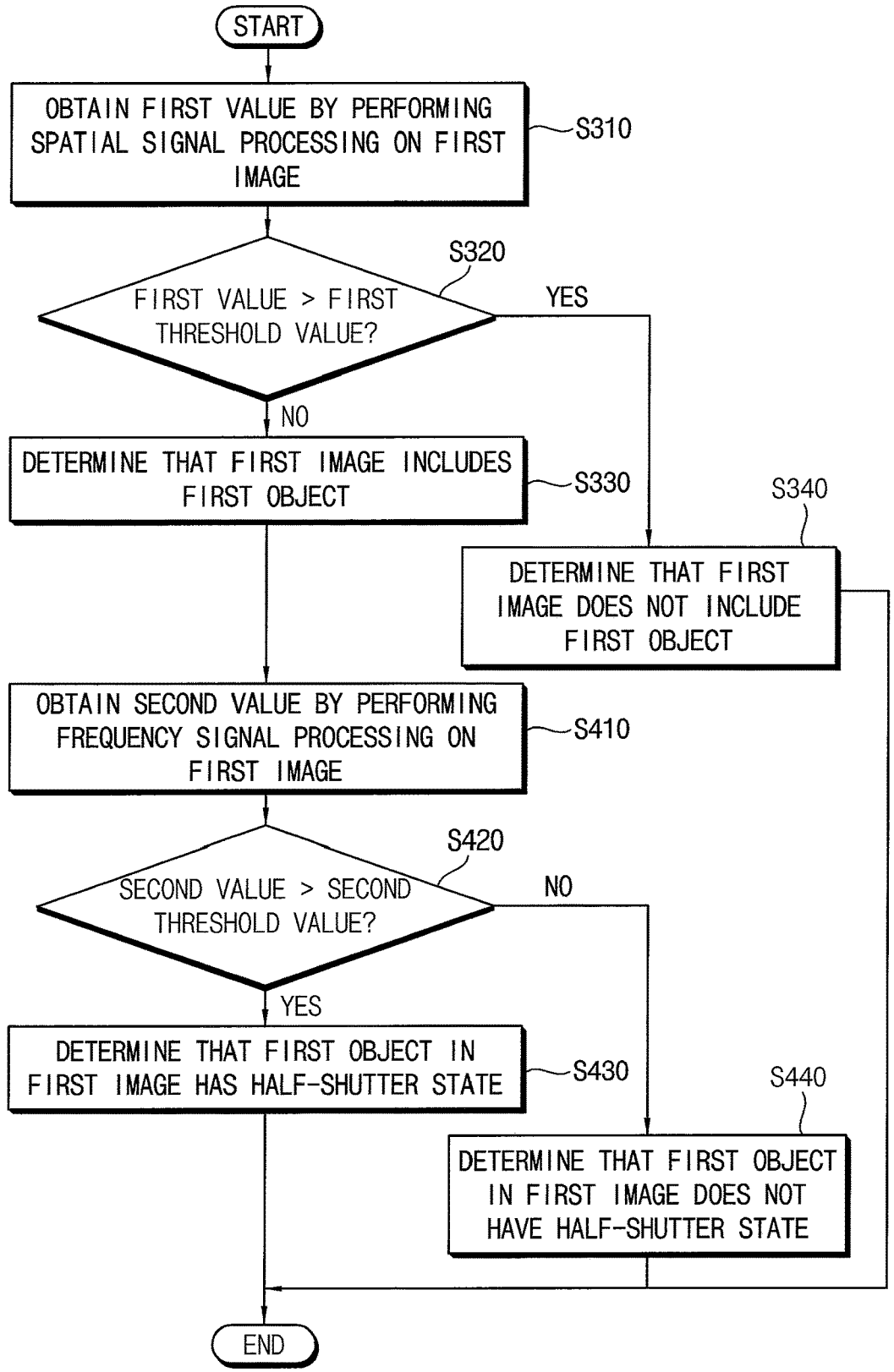
FIG. 6 is a flowchart illustrating examples of operations S300 and S400 in FIG. 1.

FIG. 6 is a flowchart illustrating examples of operations S300 and S400 in FIG. 1.

Referring to FIGS. 1 and 6, when determining whether the first image includes the first object (operation S300), a first value may be obtained by performing a spatial signal processing (or an object detection processing in a spatial domain) on the first image (operation S310). For example, the spatial signal processing may represent a scheme or method of directly using pixel values or grayscale values. For example, each of the plurality of first values may be a statistical value (e.g., a variance) based on illuminance.

However, example embodiments are not limited thereto, and at least one of various techniques may be used.

It may be determined whether the first image includes the first object based on the first value and a predetermined first threshold value. For example, when the first value is smaller than or equal to the first threshold value (operation S320: NO), it may be determined that the first image includes the first object (operation S330). When the first value is greater than the first threshold value (operation S320: YES), it may be determined that the first image does not include the first object (operation S340).

When it is determined that the first image includes the first object (operation S330), it may be determined whether the first object in the first image has the half-shutter state (operation S400).

When determining whether the first object in the first image has the half-shutter state (operation S400), a second value may be obtained by performing a frequency signal processing (or an object detection processing in a frequency domain) on the first image (operation S410). For example, the frequency signal processing may represent a scheme or method of transforming pixel values or grayscale values into frequency values (or bands) and using the transformed frequency values, such as a wavelet transform or a Fourier transform, or the like. For example, each of the plurality of second values may be a result of the Fourier transform. However, example embodiments are not limited thereto, and at least one of various techniques may be used.

It may be determined whether the first object in the first image has the half-shutter state based on the second value and a predetermined second threshold value. For example, when the second value is greater than the second threshold value (operation S420: YES), it may be determined that the first object in the first image has the half-shutter state (operation S430). When the second value is smaller than or equal to the second threshold value (operation S420: NO), it may be determined that the first object in the first image does not have the half-shutter state (operation S440). For example, the second threshold value in operation S420 may be different from the first threshold value in operation S320.

When it is determined that the first object in the first image has the half-shutter state (operation S430), the half-shutter process may be performed as illustrated in operation S500 of FIG. 1. When it is determined that the first object in the first image does not have the half-shutter state (operation S440), the method according to example embodiments may be terminated without performing the half-shutter process. For example, when the first object in the first image does not have the half-shutter state, the first object may have a full-shutter state for providing the full-shutter input or may have another state.

When it is determined that the first image does not include the first object (operation S340), the method according to example embodiments may be terminated without determining whether the first object in the first image has the half-shutter state. For example, when the first image does not include the first object, the first image may be a contaminated (or polluted) image. For example, the contaminated image may be an image including information of an external light source other than the light source of the display device, or may be an image including an object (e.g., a unique pattern of a bag when the electronic device is in the bag, etc.) other than the first object, which is a target object of the optical object recognition. For example, the image including the information of the external light source may be removed by analyzing a histogram. Typically, an image contaminated by an external light source may have a relatively high pixel value compared to a pixel value of which the light source of the display device is reflected by an object. Thus, there may be a relatively large number of pixels having pixel values greater than or equal to a predetermined threshold value in a histogram of the obtained image, and it may be determined that the obtained image is contaminated by the external light source when a plurality of pixels having pixel values greater than or equal to the threshold value are detected.

FIGS. 7A, 7B, 7C, 8 and 9 are diagrams for describing an operation of FIG. 6.

Figure 7A:
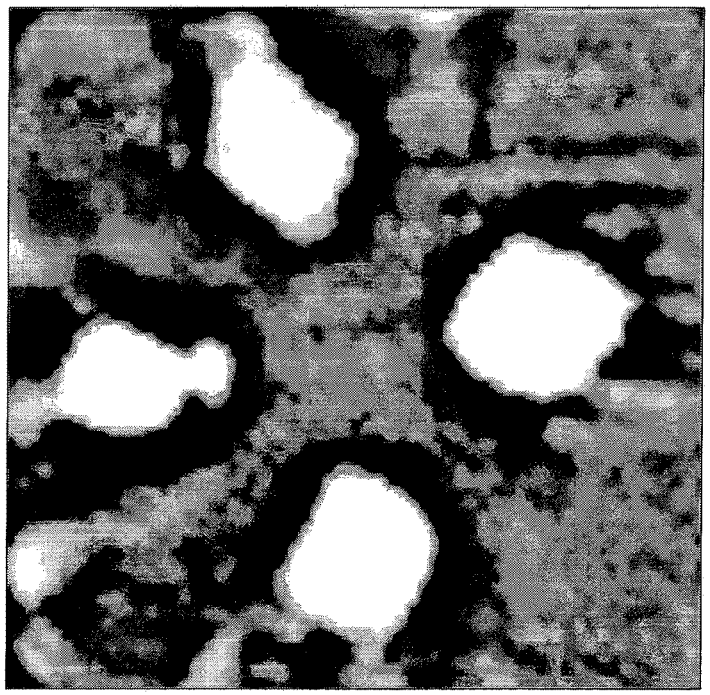
FIGS. 7A, 7B, 7C, 8 and 9 are diagrams for describing an operation of FIG. 6.

Referring to FIG. 7A, an external light source is clearly photographed or shot, and an image of FIG. 7A may represent an image contaminated by the external light source.

Figure 7B:
Figure 7C:
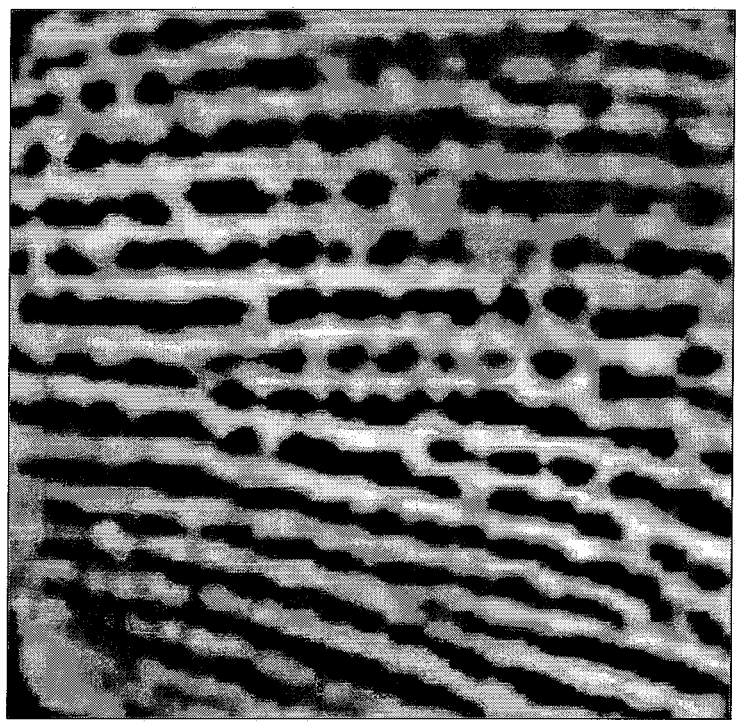

Referring to FIGS. 7B and 7C, cases where the first object is a finger of a user including a fingerprint are illustrated. As illustrated in FIG. 7B, the fingerprint is relatively blurry photographed, an object (e.g., an external light source) other than the fingerprint is partially photographed at edges of the image, and thus an image of FIG. 7B may represent a case where the finger of the user is spaced apart a certain distance from the object recognition window ORW (e.g., when the half-shutter input is provided). As illustrated in FIG. 7C, the fingerprint is relatively clearly photographed, no other object is photographed, and thus an image of FIG. 7C may represent a case where the finger of the user is in direct contact with the object recognition window ORW (e.g., when the full-shutter input is provided).

In some example embodiments, the images of FIGS. 7B and 7C may be obtained by subtracting an object-free image or an image without an object (e.g., a reference image) from an image including the object to obtain only pure information associated with the object. Typically, a panel including a display panel and a touch sensor panel has a complicated internal structure including patterns of multi-layered wirings, electrodes, and the like. When any object (or an arbitrary object) is placed on an object recognition window while light sources corresponding to the object recognition window are illuminated, reflected light received through the object recognition window includes information of the object and information of the internal structure (e.g., a bottom view) of the panel. Thus, in order to obtain only the information of the object, only information on the internal structure of the panel, which is an interference component, may be obtained first, and then a compensation for removing the interference component from an image signal obtained by the object may be performed. The reference image may represent the interference component, and may be referred to as calibration image or calibration data.

Figure 8:
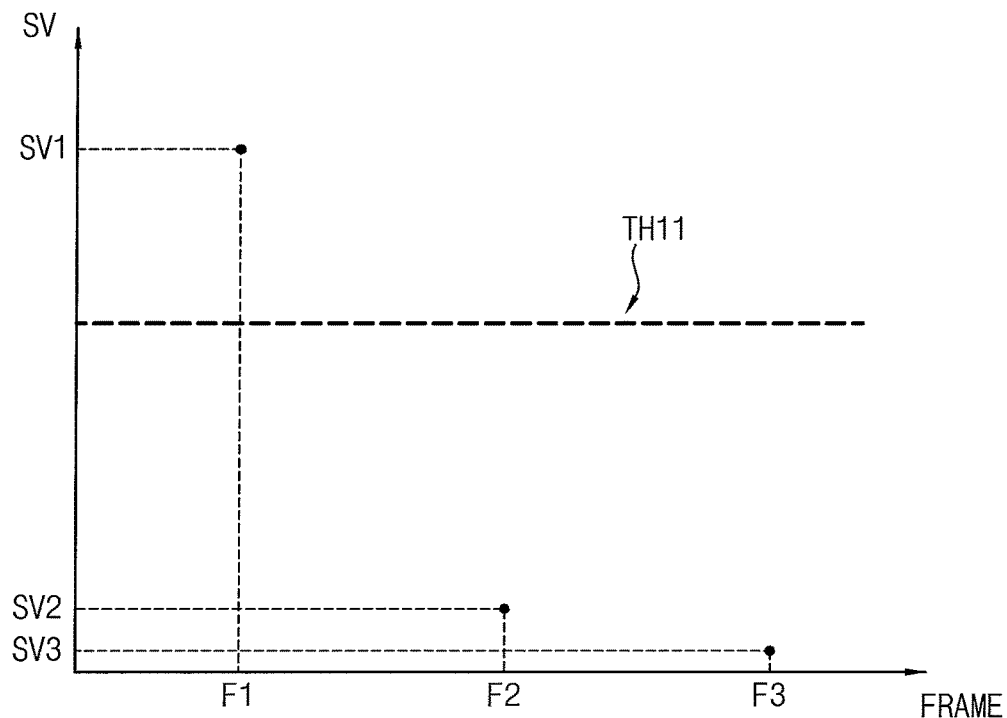

Referring to FIG. 8, an example result of performing operation S310 in FIG. 6 on the images of FIGS. 7A, 7B and 7C is illustrated. In a graph of FIG. 8, a horizontal axis FRAME represents a frame number of images, and a vertical axis SV represents the first value (e.g., a variance based on illuminance) obtained by the spatial signal processing in FIG. 6. A first frame image F1, a second frame image F2 and a third frame image F3 represent the image of FIG. 7A, the image of FIG. 7B and the image of FIG. 7C, respectively.

As illustrated in FIG. 8, a value SV1 obtained by performing the spatial signal processing on the first frame image F1 may be greater than a first threshold value TH11, and thus the image of FIG. 7A may be determined as an image that does not include the finger of the user (e.g., the contaminated image). Each of values SV2 and SV3 obtained by performing the spatial signal processing on the second and third frame images F2 and F3 may be smaller than the first threshold value TH11, and thus each of the images of FIGS. 7B and 7C may be determined as an image that includes the finger of the user.

Figure 9:
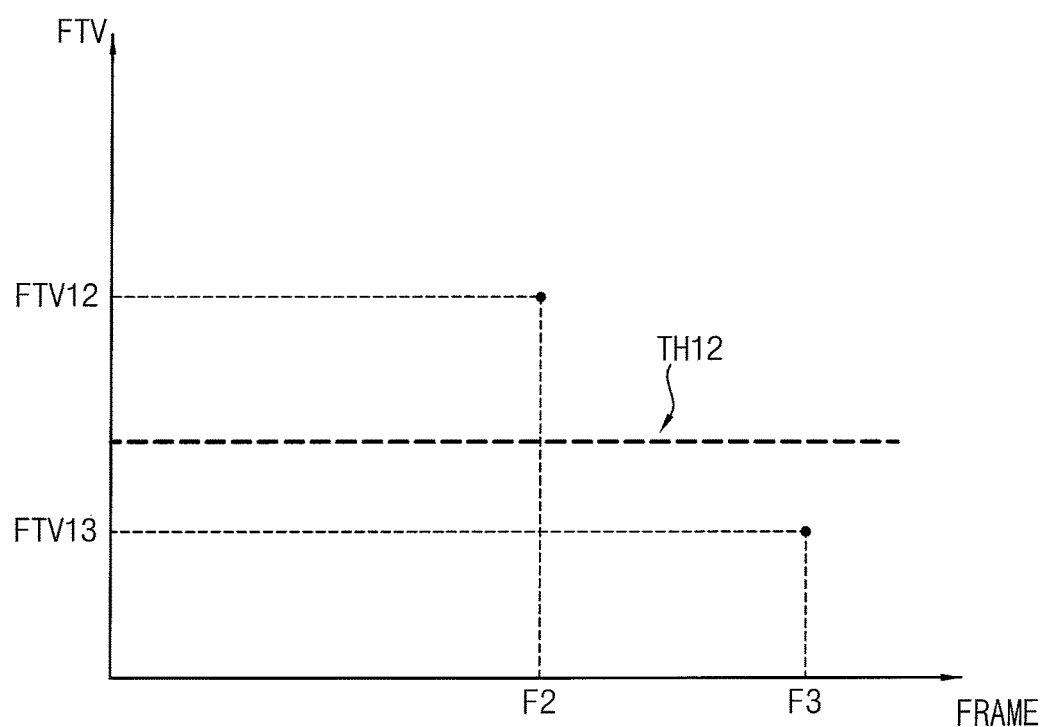

Referring to FIG. 9, an example result of performing operation S410 in FIG. 6 on the images of FIGS. 7B and 7C is illustrated. Since the image of FIG. 7A does not include the finger of the user, operation S410 may not be performed on the image of FIG. 7A. In a graph of FIG. 9, a horizontal axis FRAME represents a frame number of images, and a vertical axis FTV represents the second value (e.g., a result of the Fourier transform) obtained by the frequency signal processing in FIG. 6.

As illustrated in FIG. 9, a value FTV12 obtained by performing the frequency signal processing on the second frame image F2 may be greater than a second threshold value TH12, and thus it may be determined that the finger of the user in the image of FIG. 7B has or is in the half-shutter state. A value FTV13 obtained by performing the frequency signal processing on the third frame image F3 may be smaller than the second threshold value TH12, and thus it may be determined that the finger of the user in the image of FIG. 7C does not have or is not in the half-shutter state, (e.g., has or is in the full-shutter state).

Figure 10:
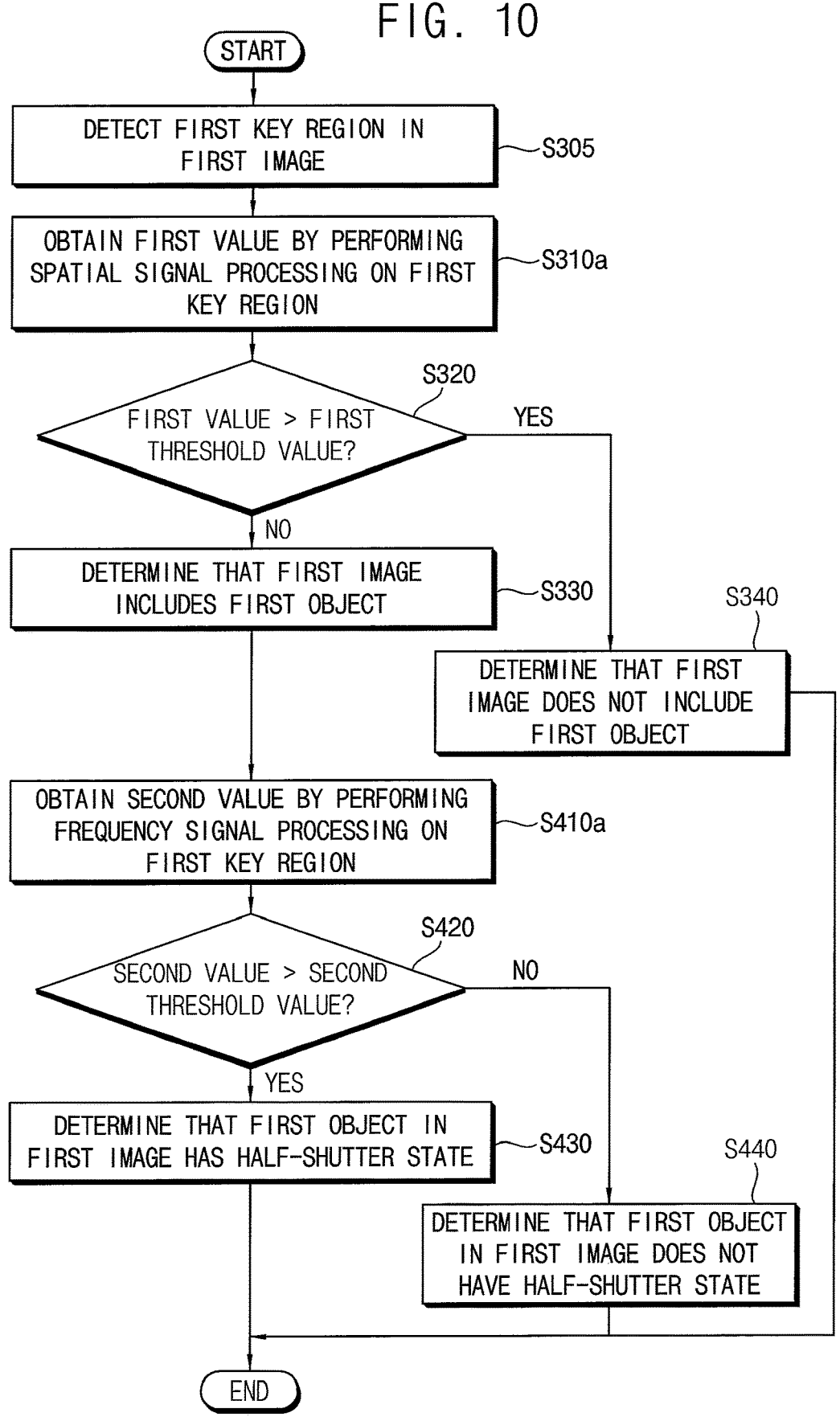
FIGS. 10 and 11 are flowcharts illustrating examples of operations S300 and S400 in FIG. 1.
Figure 11:
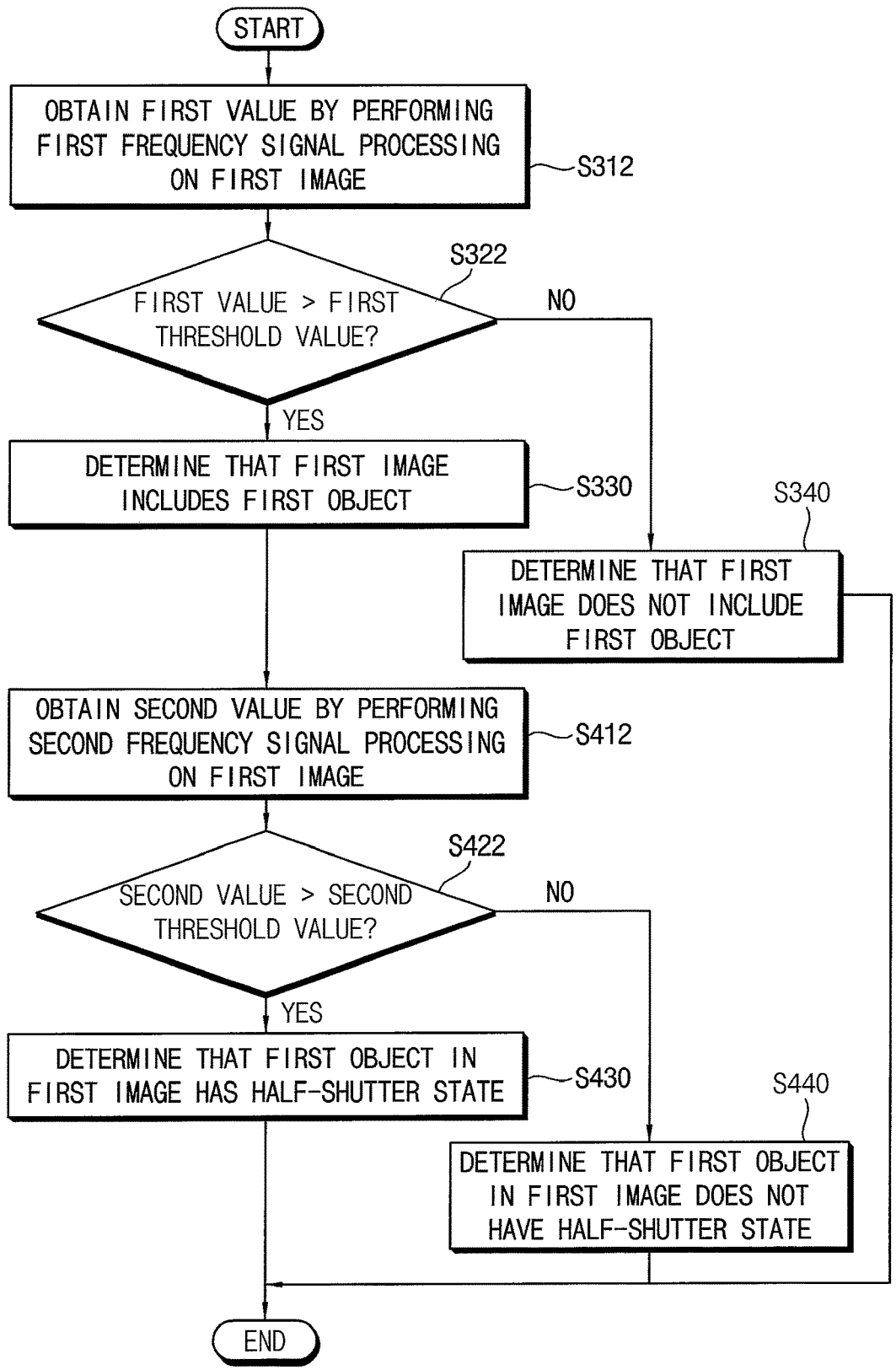

FIGS. 10 and 11 are flowcharts illustrating examples of operations S300 and S400 in FIG. 1. The descriptions repetitive with FIG. 6 will be omitted.

Referring to FIG. 10, an example of FIG. 10 may be substantially the same as the example of FIG. 6, except that operation S305 is added to the example of FIG. 10 and operations S310 and S410 in FIG. 6 are changed to operations S310a and S410a in FIG. 10, respectively.

A first key region (e.g., main region or important region) in the first image may be detected (operation S305). Typically, the object recognition sensor may be equipped for purpose of touch sensing, and an image other than a target to be used for detecting the half-shutter input may be obtained because the photographing range and the purpose of the object recognition sensor do not match with those for detecting the half-shutter input. According to an example embodiment, the half-shutter input detection efficiency may be increased by determining a portion corresponding to the target and performing a detection process only with respect to the determined portion (e.g., the key region). The key region detection may be a concept that includes the spatial domain detection and the frequency domain detection, and may detect a wider range of candidates. The key region may be referred to as a region of interest (ROI).

Thereafter, the spatial signal processing in operation S310a of FIG. 10 and the frequency signal processing in operation S410a of FIG. 10 may be performed only on the first key region in the first image.

Referring to FIGS. 1 and 11, when determining whether the first image includes the first object (operation S300), a first value may be obtained by performing a first frequency signal processing on the first image (operation S312). For example, the first frequency signal processing in operation S312 of FIG. 11 may be substantially the same as or different from the frequency signal processing in operation S410 of FIG. 6.

It may be determined whether the first image includes the first object based on the first value and a predetermined first threshold value. For example, when the first value is greater than the first threshold value (operation S322: YES), it may be determined that the first image includes the first object (operation S330). When the first value is smaller than or equal to the first threshold value (operation S322: NO), it may be determined that the first image does not include the first object (operation S340). For example, the first threshold value in operation S322 of FIG. 11 may be different from the first threshold value in operation S320 of FIG. 6.

When determining whether the first object in the first image has the half-shutter state (operation S400), a second value may be obtained by performing a second frequency signal processing on the first image (operation S412). The second frequency signal processing in operation S412 may be at least partially different from the first frequency signal processing in operation S312. For example, the algorithm, implementation scheme, etc. may be different from each other, or the accuracy, resolution, etc. of the processing result may be different from each other. For example, the second frequency signal processing in operation S412 of FIG. 11 may be substantially the same as or different from the frequency signal processing in operation S410 of FIG. 6.

It may be determined whether the first object in the first image has the half-shutter state based on the second value and a predetermined second threshold value. For example, when the second value is greater than the second threshold value (operation S422: YES), it may be determined that the first object in the first image has the half-shutter state (operation S430). When the second value is smaller than or equal to the second threshold value (operation S422: NO), it may be determined that the first object in the first image does not have the half-shutter state (operation S440). For example, the second threshold value in operation S422 may be different from the first threshold value in operation S322. For example, the second threshold value in operation S422 of FIG. 11 may be substantially the same as or different from the second threshold value in operation S420 of FIG. 6.

Unlike the example of FIG. 6 where each of the spatial signal processing and the frequency signal processing is performed once, only the frequency signal processing may be performed twice in the example of FIG. 11.

Figure 12:
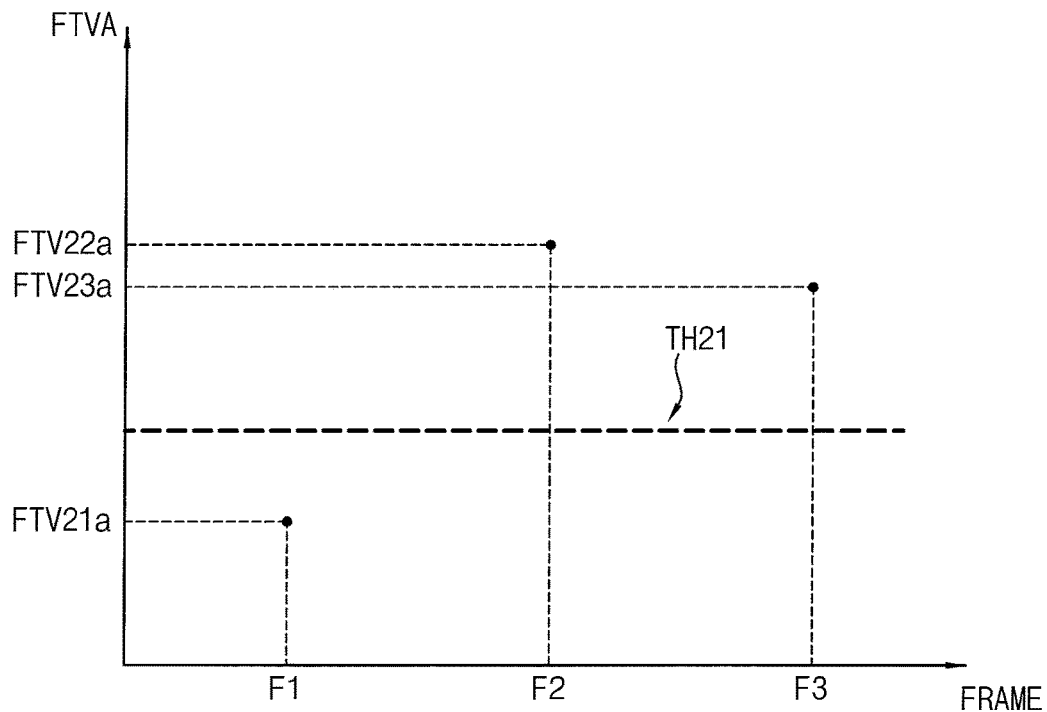
FIGS. 12 and 13 are diagrams for describing an operation of FIG. 11.
Figure 13:
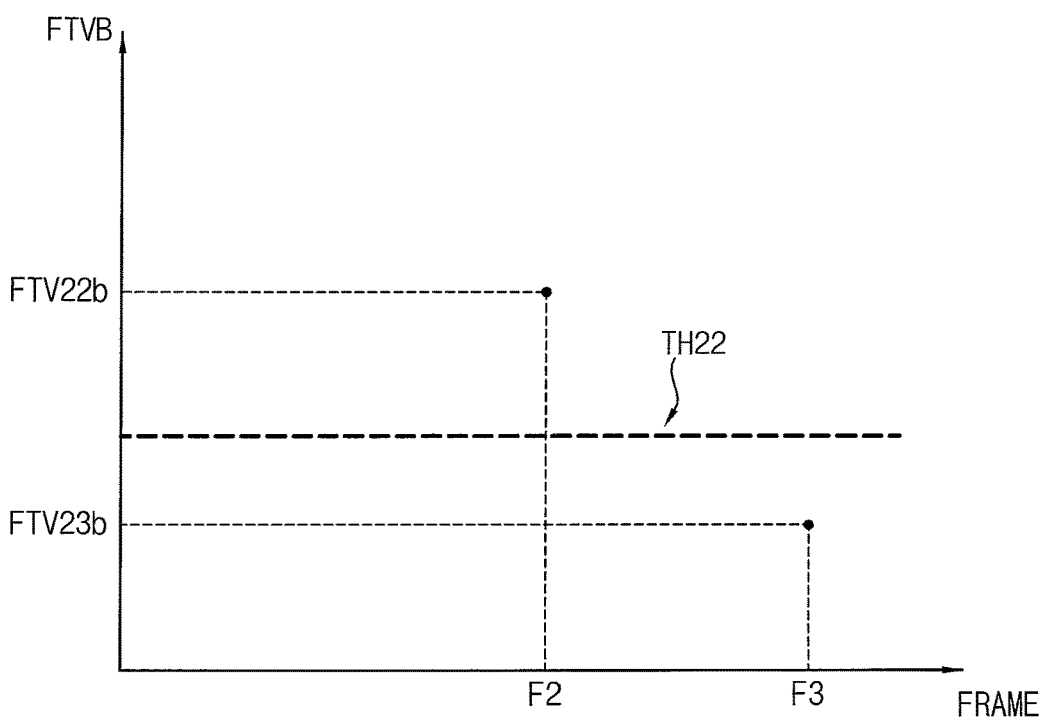

FIGS. 12 and 13 are diagrams for describing an operation of FIG. 11. The descriptions repetitive with FIGS. 8 and 9 will be omitted.

Referring to FIG. 12, an example result of performing operation S312 in FIG. 11 on the images of FIGS. 7A, 7B and 7C is illustrated. In a graph of FIG. 12, a horizontal axis FRAME represents a frame number of images, and a vertical axis FTVA represents the first value obtained by the first frequency signal processing in FIG. 11.

As illustrated in FIG. 12, a value FTV21a obtained by performing the first frequency signal processing on the first frame image F1 may be smaller than a first threshold value TH21, and thus the image of FIG. 7A may be determined as an image that does not include the finger of the user (e.g., the contaminated image). Each of the values FTV22a and FTV23a obtained by performing the first frequency signal processing technique on the second and third frame images F2 and F3 may be greater than the first threshold value TH21, and thus each of the images of FIGS. 7B and 7C may be determined as an image that includes the finger of the user.

Referring to FIG. 13, an example result of performing operation S412 in FIG. 11 on the images of FIGS. 7B and 7C is illustrated. Since the image of FIG. 7A does not include the finger of the user, operation S412 may not be performed on the image of FIG. 7A. In a graph of FIG. 13, a horizontal axis FRAME represents a frame number of images, and a vertical axis FTVB represents the second value obtained by the second frequency signal processing in FIG. 11.

As illustrated in FIG. 13, a value FTV22b obtained by performing the second frequency signal processing on the second frame image F2 may be greater than a second threshold value TH22, and thus it may be determined that the finger of the user in the image of FIG. 7B has the half-shutter state. A value FTV23b obtained by performing the second frequency signal processing on the third frame image F3 may be smaller than the second threshold value TH22, and thus it may be determined that the finger of the user in the image of FIG. 7C does not have the half-shutter state (e.g., has the full-shutter state).

Figure 14:
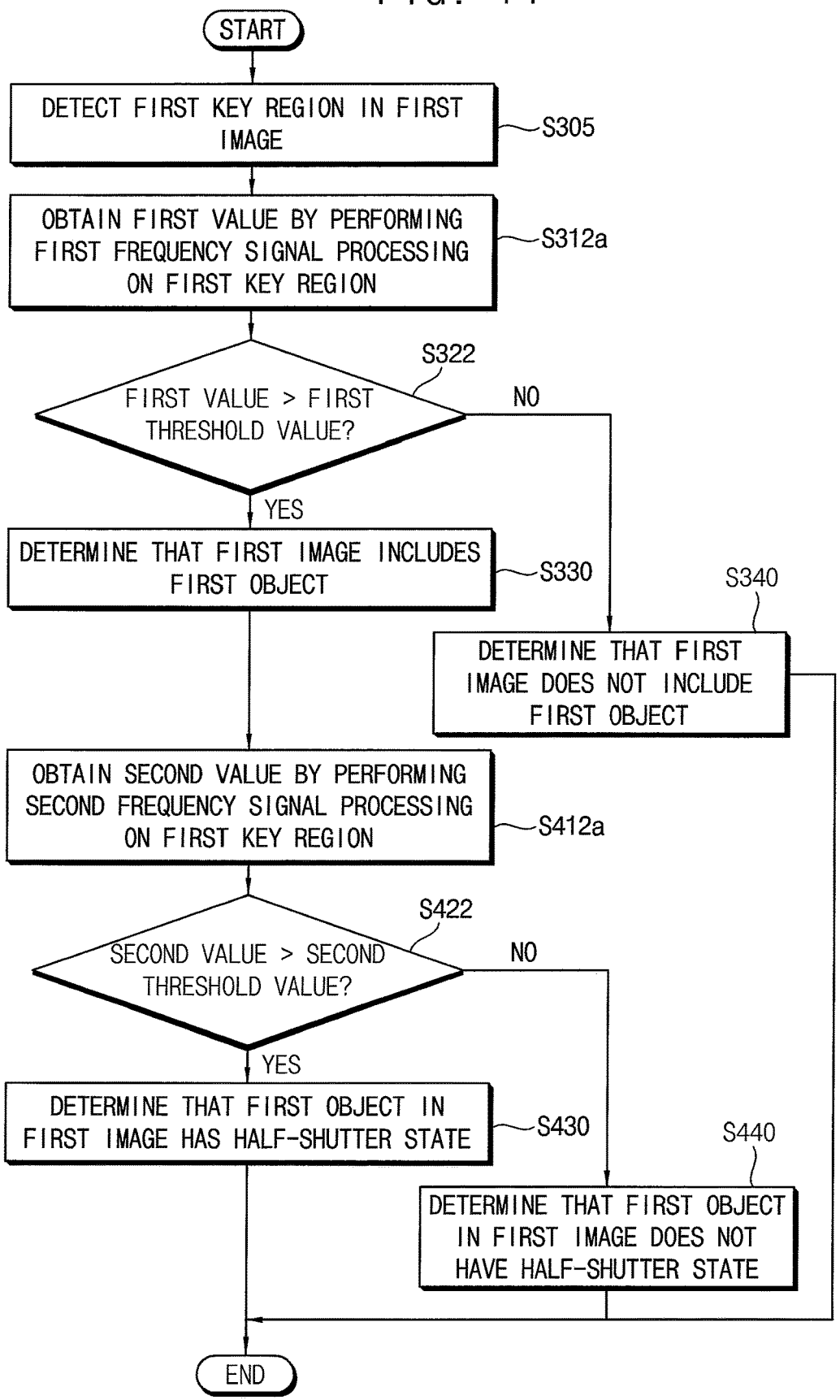
FIGS. 14 and 15 are flowcharts illustrating examples of operations S300 and S400 in FIG. 1.
Figure 15:
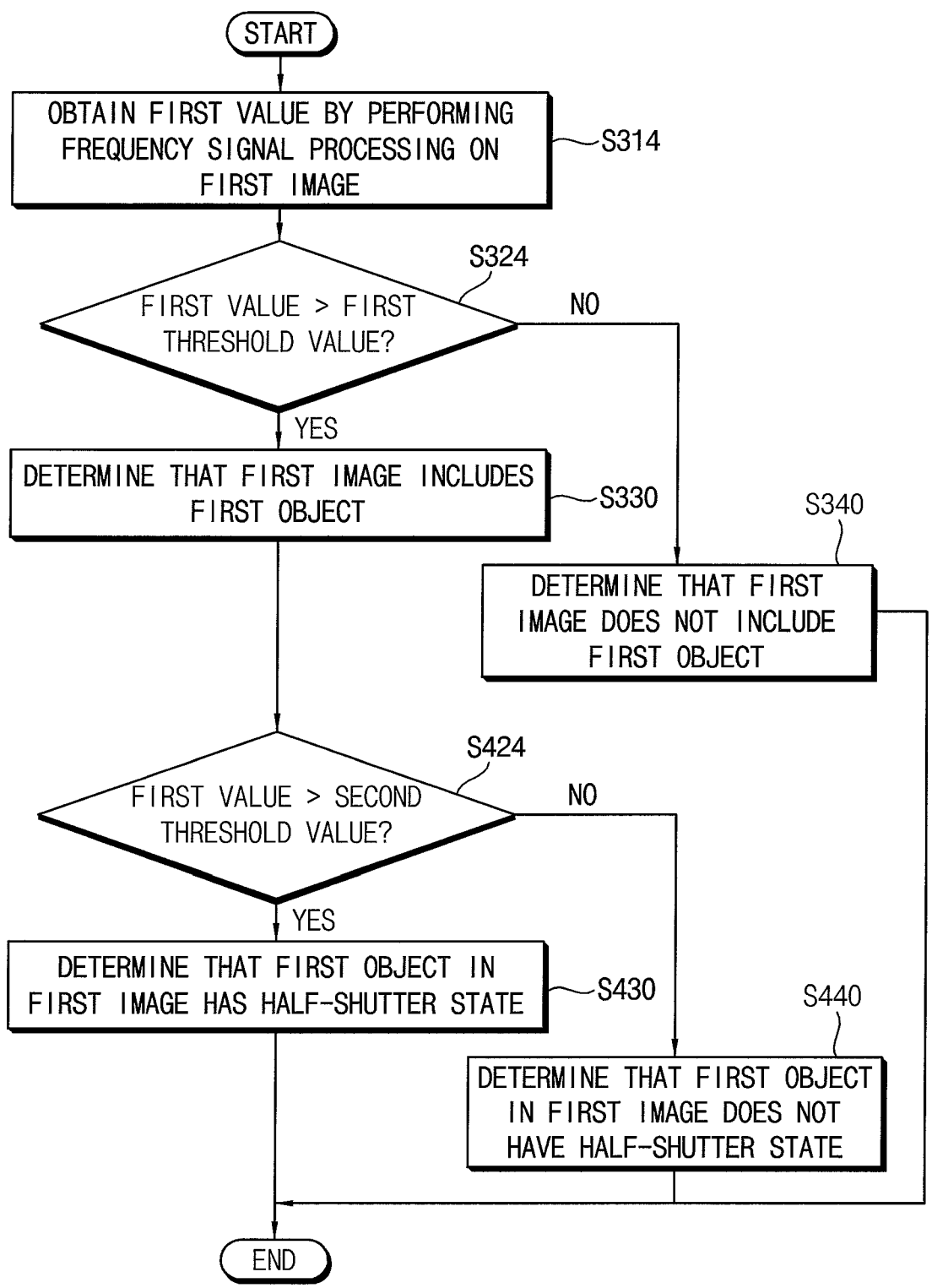

FIGS. 14 and 15 are flowcharts illustrating examples of operations S300 and S400 in FIG. 1. The descriptions repetitive with FIGS. 6, 10 and 11 will be omitted.

Referring to FIG. 14, an example of FIG. 14 may be substantially the same as the example of FIG. 11, except that operation S305 is added to the example of FIG. 14 and operations S312 and S412 in FIG. 11 are changed to operations S312a and S412a in FIG. 14, respectively. Operation S305 in FIG. 14 may be substantially the same as operation S305 in FIG. 10. The first frequency signal processing in operation S312a of FIG. 14 and the second frequency signal processing in operation S412a of FIG. 14 may be performed only on the first key region in the first image.

Referring to FIGS. 1 and 15, when determining whether the first image includes the first object (operation S300), a first value may be obtained by performing a frequency signal processing on the first image (operation S314). For example, the frequency signal processing in operation S314 of FIG. 15 may be substantially the same as or different from the frequency signal processing in operation S410 of FIG. 6, the first frequency signal processing in operation S312 of FIG. 11 and/or the second frequency signal processing in operation S412 of FIG. 11.

It may be determined whether the first image includes the first object based on the first value and a predetermined first threshold value (operation S324). For example, when the first value is greater than the first threshold value (operation S324: YES), it may be determined that the first image includes the first object (operation S330). When the first value is smaller than or equal to the first threshold value (operation S324: NO), it may be determined that the first image does not include the first object (operation S340). For example, the first threshold value in operation S324 of FIG. 15 may be substantially the same as or different from the first threshold value in operation S322 of FIG. 11.

When determining whether the first object in the first image has the half-shutter state (operation S400), it may be determined whether the first object in the first image has the half-shutter state based on the first value and a predetermined second threshold value. For example, when the first value is greater than the second threshold value (operation S424: YES), it may be determined that the first object in the first image has the half-shutter state (operation S430). When the first value is smaller than or equal to the second threshold value (operation S424: NO), it may be determined that the first object in the first image does not have the half-shutter state (operation S440). For example, the second threshold value in operation S424 may be different from the first threshold value in operation S324. For example, the second threshold value in operation S424 of FIG. 15 may be substantially the same as or different from the second threshold value in operation S422 of FIG. 11.

Unlike the example of FIG. 6 where each of the spatial signal processing and the frequency signal processing is performed once and the example of FIG. 11 where the frequency signal processing is performed twice, only the frequency signal processing may be performed once in the example of FIG. 15.

Figure 16:
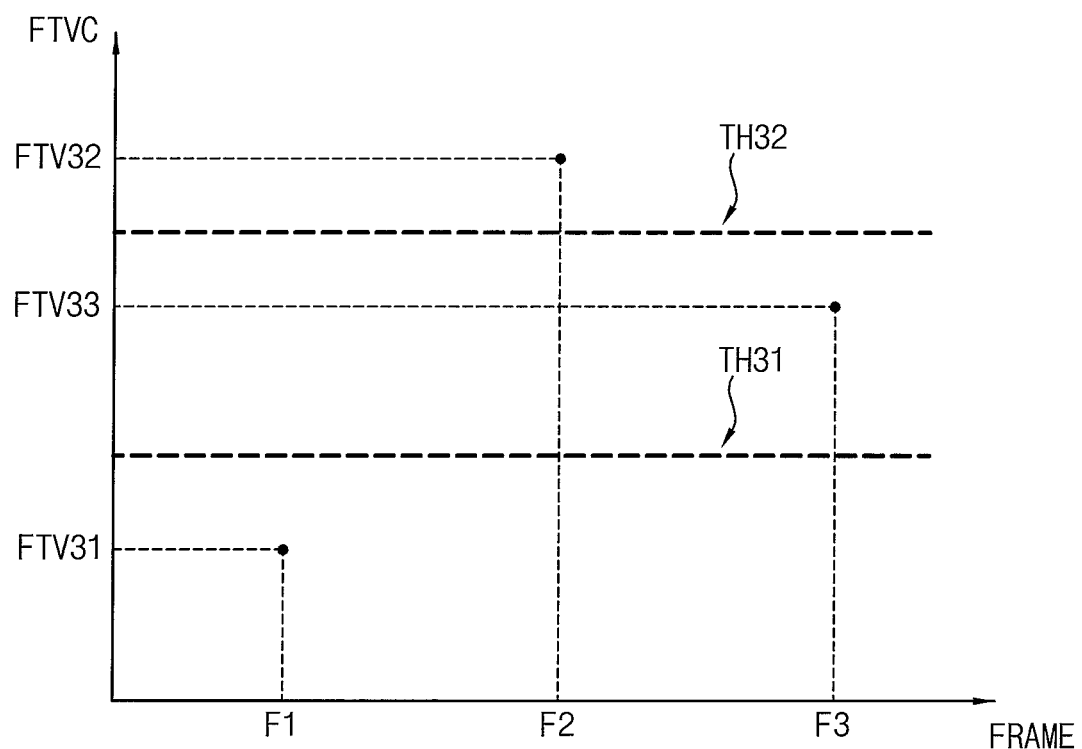
FIG. 16 is a diagram for describing an operation of FIG. 15.

FIG. 16 is a diagram for describing an operation of FIG. 15. The descriptions repetitive with FIGS. 8, 9, 12 and 13 will be omitted.

Referring to FIG. 16, an example result of performing operation S314 in FIG. 15 on the images of FIGS. 7A, 7B and 7C is illustrated. In a graph of FIG. 16, a horizontal axis FRAME represents a frame number of images, and a vertical axis FTVC represents the first value obtained by the frequency signal processing in FIG. 15.

As illustrated in FIG. 16, a value FTV31 obtained by performing the frequency signal processing on the first frame image F1 may be smaller than a first threshold value TH31, and thus the image of FIG. 7A may be determined as an image that does not include the finger of the user (e.g., the contaminated image). A value FTV32 obtained by performing the frequency signal processing on the second frame image F2 may be greater than the first threshold value TH31 and greater than a second threshold value TH32, and thus the image of FIG. 7B may be determined as an image including the finger of the user that has the half-shutter state. A value FTV33 obtained by performing the frequency signal processing on the third frame image F3 may be greater than the first threshold value TH31 and smaller than the second threshold value TH32, and thus the image of FIG. 7C may be determined as an image including the finger of the user that does not have the half-shutter state (e.g., has the full-shutter state).

Figure 17:
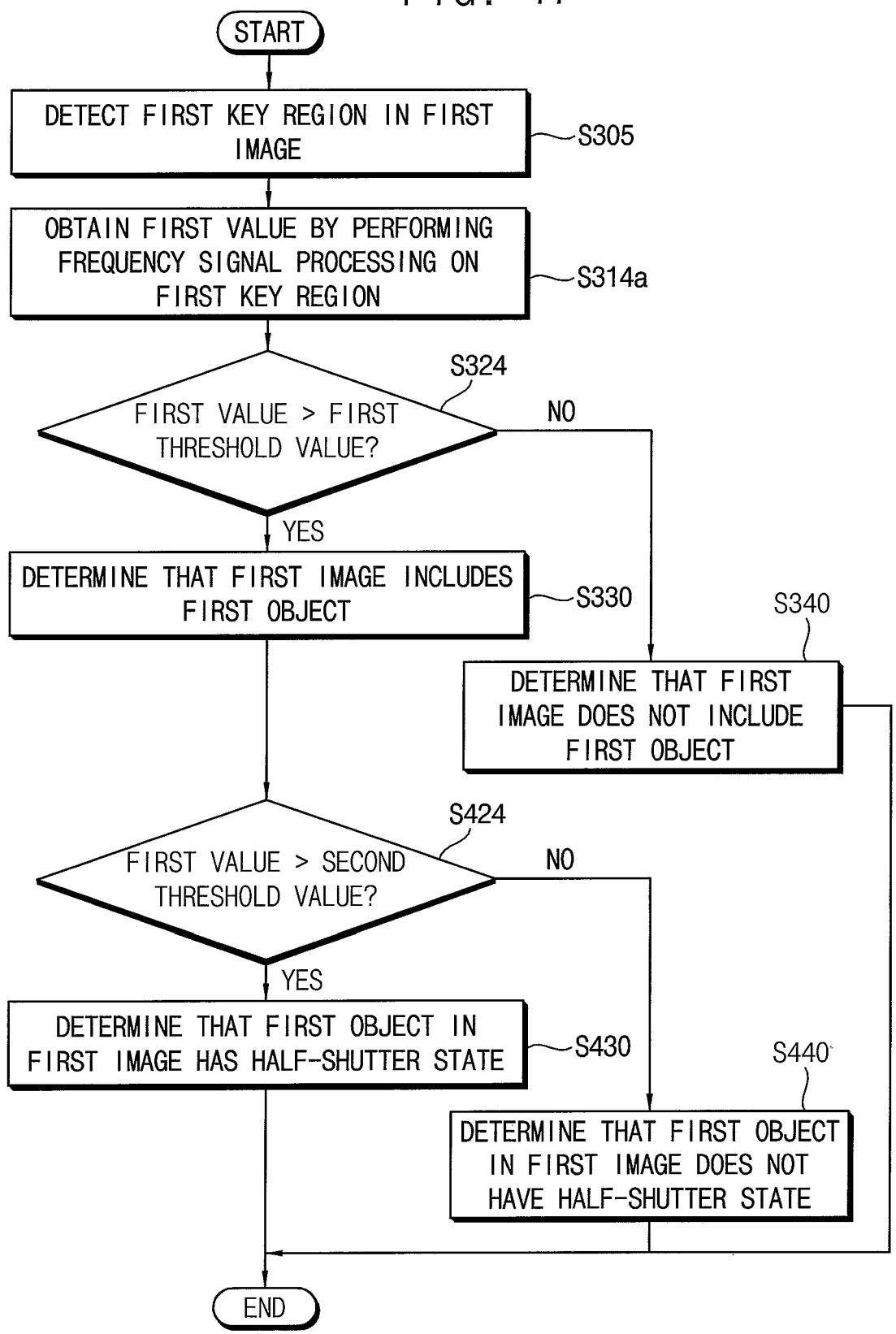
FIG. 17 is a flowchart illustrating examples of operations S300 and S400 in FIG. 1.

FIG. 17 is a flowchart illustrating examples of operations S300 and S400 in FIG. 1. The descriptions repetitive with FIGS. 6, 10, 11 and 15 will be omitted.

Referring to FIG. 17, an example of FIG. 17 may be substantially the same as the example of FIG. 15, except that operation S305 is added to the example of FIG. 17 and operation S314 in FIG. 15 is changed to operation S314a in FIG. 17. Operation S305 in FIG. 17 may be substantially the same as operation S305 in FIG. 10. The frequency signal processing in operation S314a of FIG. 17 may be performed only on the first key region in the first image.

Figure 18:
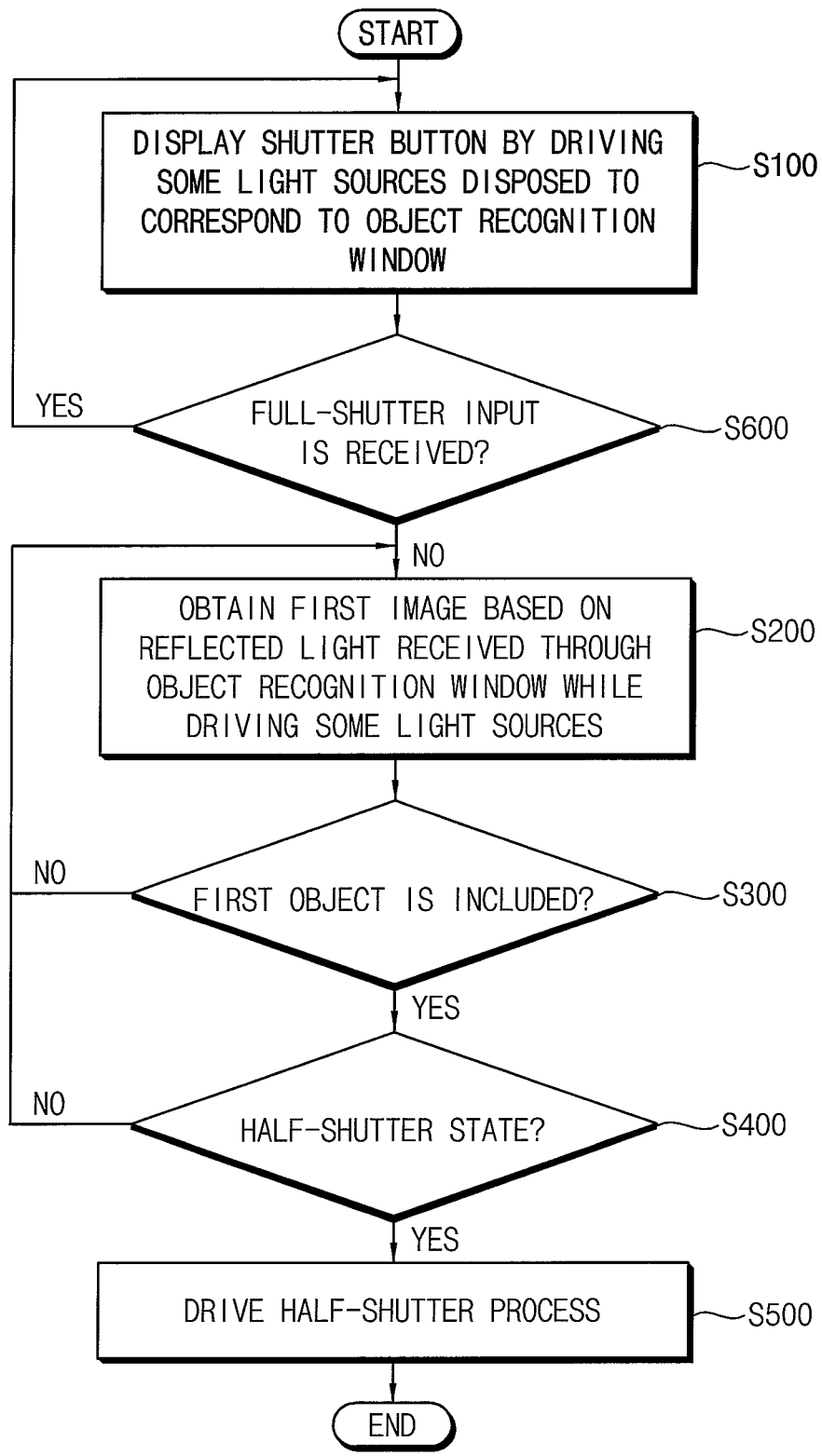
FIGS. 18 and 19 are flowcharts illustrating a method of performing half-shutter function using optical object recognition according to example embodiments.
Figure 19:
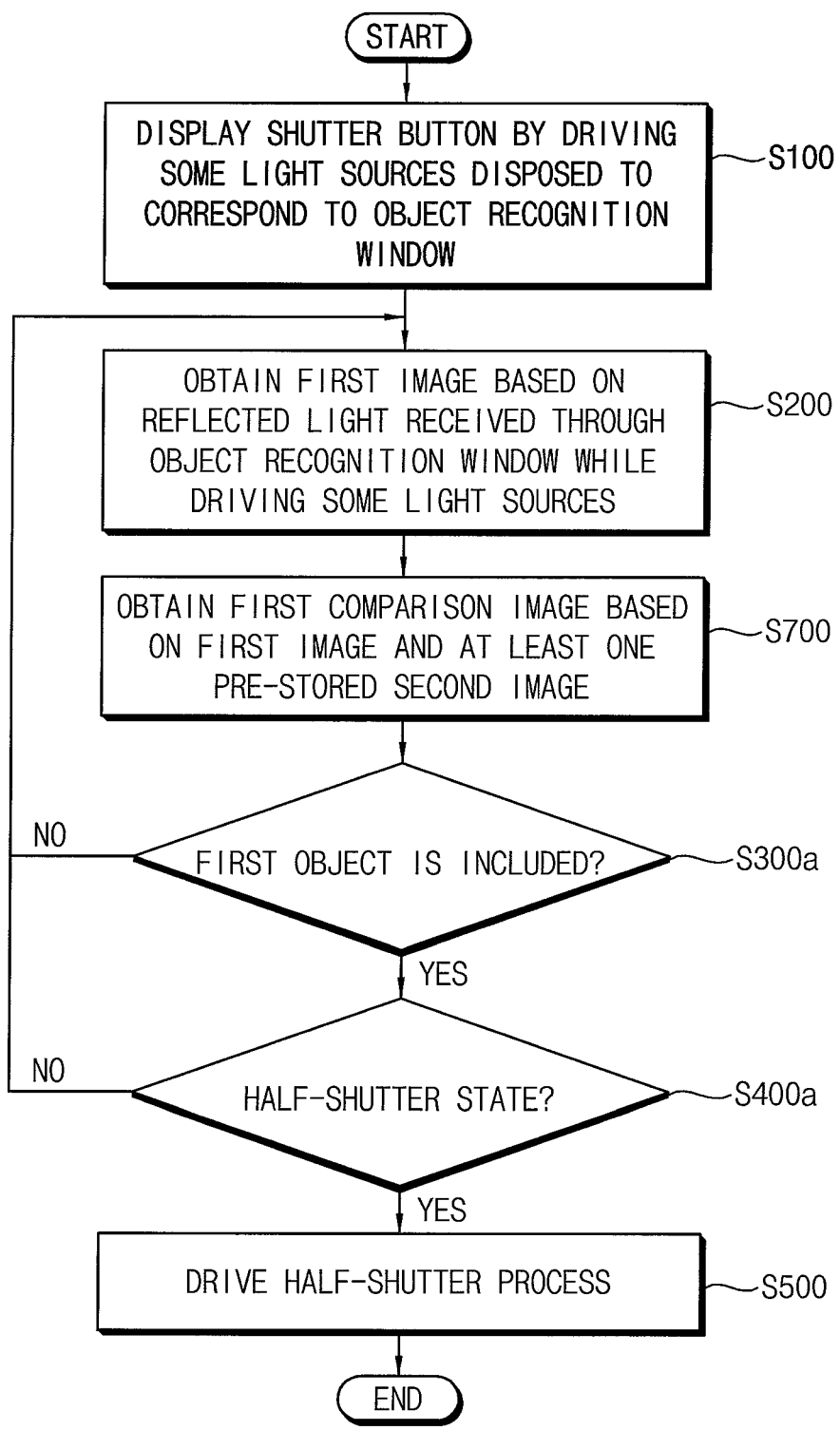

FIGS. 18 and 19 are flowcharts illustrating a method of performing half-shutter function using optical object recognition according to example embodiments. The descriptions repetitive with FIG. 1 will be omitted.

Referring to FIG. 18, operations S100, S200, S300, S400 and S500 in FIG. 18 may be substantially the same as operations S100, S200, S300, S400 and S500 in FIG. 1, respectively.

It may be determined whether the full-shutter input is received (operation S600). Only when before the full-shutter input is received, e.g., when the full-shutter input is not received yet (operation S600: NO), operations S200, S300, S400 and S500 may be performed to obtain the first image, to determine whether the first image includes the first object, to determine whether the first object in the first image has the half-shutter state, and to drive the half-shutter process. When after the full-shutter input is received, e.g., when the full-shutter input is already received (operation S600: YES), the next process may be waited while the shutter button is displayed.

According to the disclosure, a certain state (or situation) before the full-shutter input is detected as the half-shutter state and utilized to perform the half-shutter function, and the half-shutter function may not be performed after receiving the full-shutter input. However, example embodiments are not limited thereto. For example, in addition to the preparation operation, example embodiments may be applied in post-processing of images after receiving the full-shutter input (e.g., a tough input). For example, when finger information exists together with the shutter input, the finger information may be used as a half-shutter or post-processing command by reflecting touch sensor input information.

In some example embodiments, the full-shutter input in operation S600 of FIG. 18 may be provided by a touch input of a user through a touch sensor panel (e.g., the touch sensor panel 115 in FIG. 4).

Referring to FIG. 19, operations S100, S200 and S500 in FIG. 19 may be substantially the same as operations S100, S200 and S500 in FIG. 1, respectively.

A first comparison image may be obtained based on the first image and at least one second image that is pre-stored or stored in advance (operation S700). Unlike the example of FIG. 1, an operation of determining whether the first object is included (operation S300a) and an operation of determining whether the first object in the first image has the half-shutter state (operation S400a) may be performed based on the first comparison image rather than the first image.

In some example embodiments, as will be described with reference to FIG. 20, a plurality of images including the first image may be continuously obtained based on reflected light received by the object recognition sensor through the object recognition window, and the at least one second image may be an image obtained before the first image is obtained, among the plurality of images that are continuously obtained. By continuously capturing or shooting, a previously captured image may be stored in a storage (e.g., the memory 150 in FIG. 4) and may be compared with a currently captured image, and thus the accuracy and efficiency of half-shutter input detection may be improved or enhanced by using a change in the currently captured image that does not exist among previously captured images. Here, the continuous capturing or shooting may be one of examples using similarities of temporal and spatial information among various information.

In some example embodiments, the first comparison image may be obtained or updated by performing signal processing in the form of a finite impulse response (FIR) or an infinite impulse response (IIR) rather than using only one image. In the FIR, one object-free image with high quality (or performance) may be obtained by storing and using a specific number of object-free images. In the IIR, one object-free image with high quality may be updated and used whenever a new object-free image is input. In a case of the FIR, object-free images in a specific environment may be collected to obtain an image optimized for the specific environment. In a case of the IIR, updates may be performed slowly but may be applied extensively using accumulated information.

As described above, the half-shutter input detection algorithm according to example embodiments may have several advantages. In a spatial aspect, the spatial domain detection and the frequency domain detection may be used to detect the half-shutter input. In a temporal aspect, the comparison image may be used or detected based on not only the current image but also the previous images stored in advance to improve or enhance the accuracy and efficiency of detection of the half-shutter input. Additionally, with respect to an object that is used in the half-shutter input detection, the half-shutter state may be identified by detecting various objects and situations as well as a finger to recognize a situation before pressing the shutter button as the half-shutter input. In some example embodiments, the previous images may not be limited to be used for detecting differences from the current image, and may be used to detect various types of a shutter input and/or a ready state (e.g., image capturing preparation state) by using image information obtained when the shutter button is input.

Figure 20:
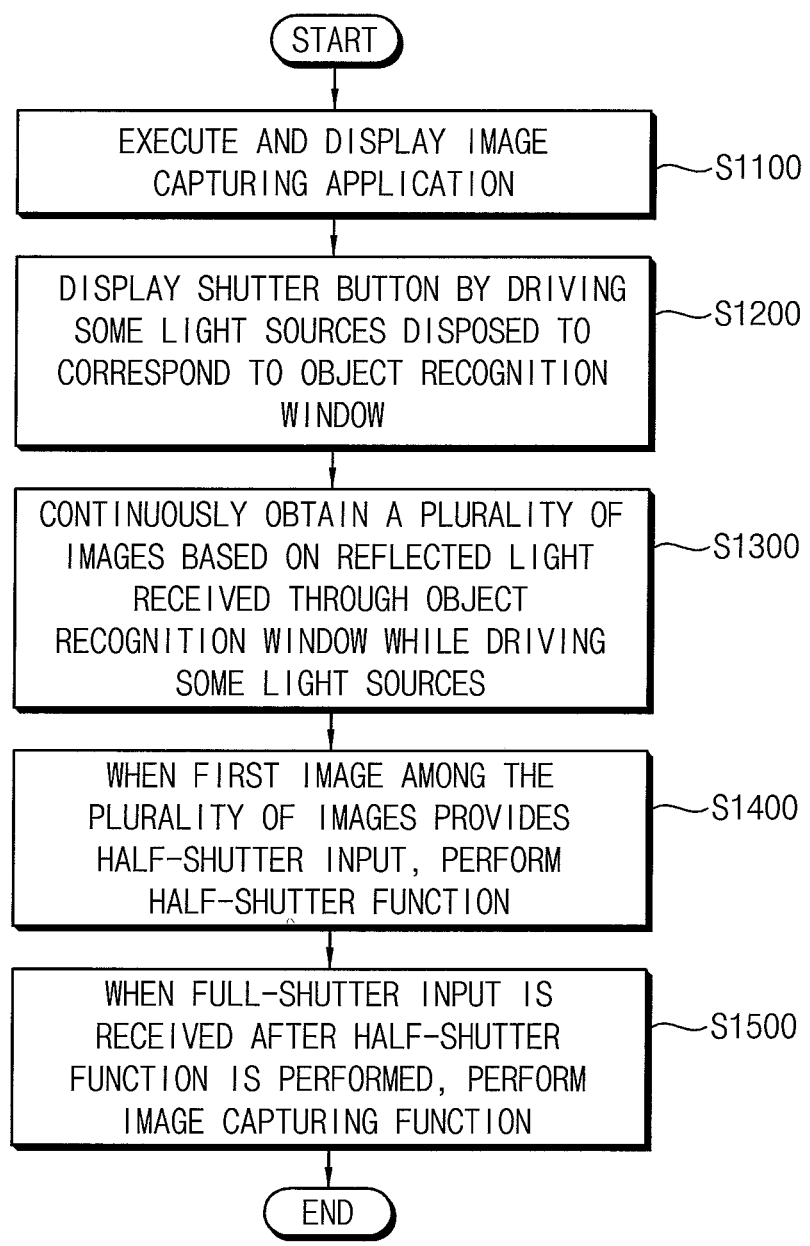
FIG. 20 is a flowchart illustrating a method of capturing an image according to example embodiments.

FIG. 20 is a flowchart illustrating a method of capturing an image according to example embodiments. The descriptions repetitive with FIG. 1 will be omitted.

Referring to FIG. 20, in a method of capturing an image according to example embodiments, an image capturing application providing an image capturing function is displayed on a display panel including a plurality of light sources by executing the image capturing application (operation S1100). A shutter button is displayed by driving a portion of the plurality of light sources among the plurality of light sources included in the display panel (operation S1200). Operation S1200 in FIG. 20 may be substantially the same as operation S100 in FIG. 1.

While driving the portion of the plurality of light sources, a plurality of images are continuously obtained or acquired based on reflected light received by the object recognition sensor through the object recognition window (operation S1300). Operation S1300 in FIG. 20 may be similar to operation S200 in FIG. 1. For example, the object recognition sensor may continuously or sequentially obtain several images corresponding to the object recognition window and/or the object based on the reflected light. Here, the continuous capturing or shooting may be one of examples using similarities of temporal and spatial information among various information.

When a first image among the plurality of images provides a half-shutter input, a half-shutter function is performed (operation S1400). Operation S1400 in FIG. 20 may include operations S300, S400 and S500 in FIG. 1.

When a full-shutter input is received after the half-shutter function is performed, an image capturing function is performed (operation S1500).

In some example embodiments, a touch input of a user received through a touch sensor panel (e.g., the touch sensor panel 115 in FIG. 4) may provide the full-shutter input. For example, the touch sensor panel may sense the full-shutter input when a finger of the user directly contacts the object recognition window.

In other example embodiments, a second image obtained after the first image among the plurality of images may provide the full-shutter input. For example, when a first object in the second image has the full-shutter state for providing the full-shutter input, the image capturing function may be performed based on the full-shutter state. In this example, the full-shutter input may be identified and the image capturing function may be performed using the object recognition sensor even if the touch sensor panel does not normally operate (or if the touch sensor panel does not detect the touch input).

FIGS. 21A, 21B, 21C and 22 are diagrams for describing a method of capturing an image of FIG. 20.

Figure 21A:
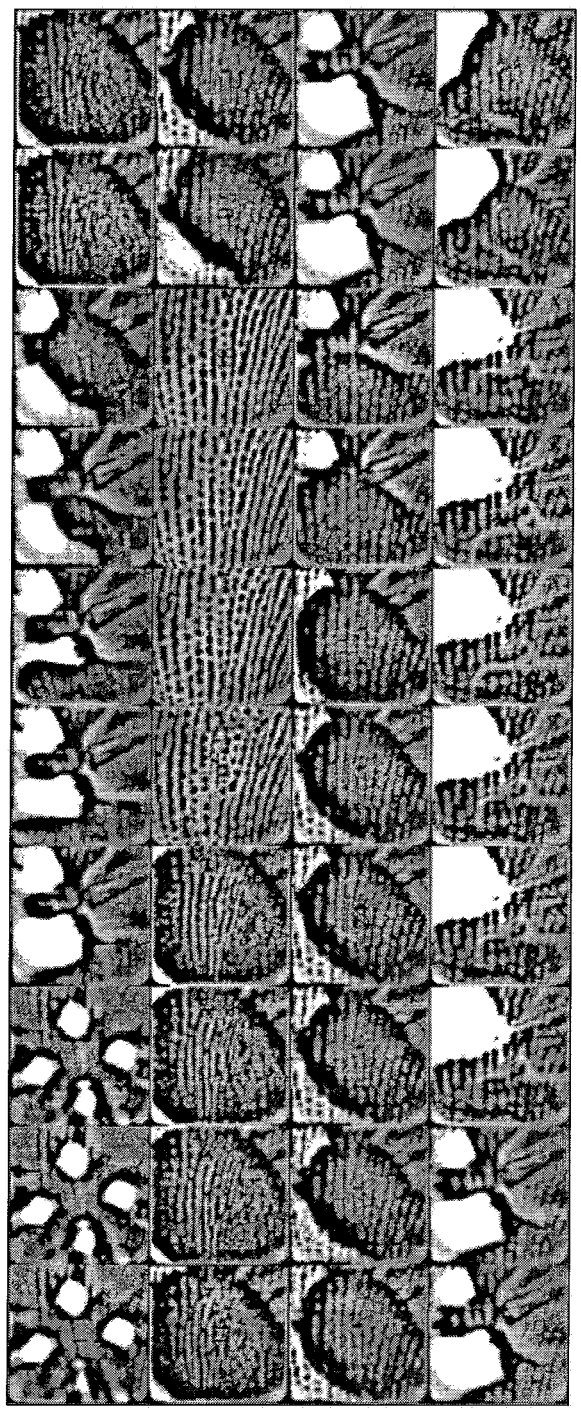
FIGS. 21A, 21B, 21C and 22 are diagrams for describing a method of capturing an image of FIG. 20.
Figure 21B:
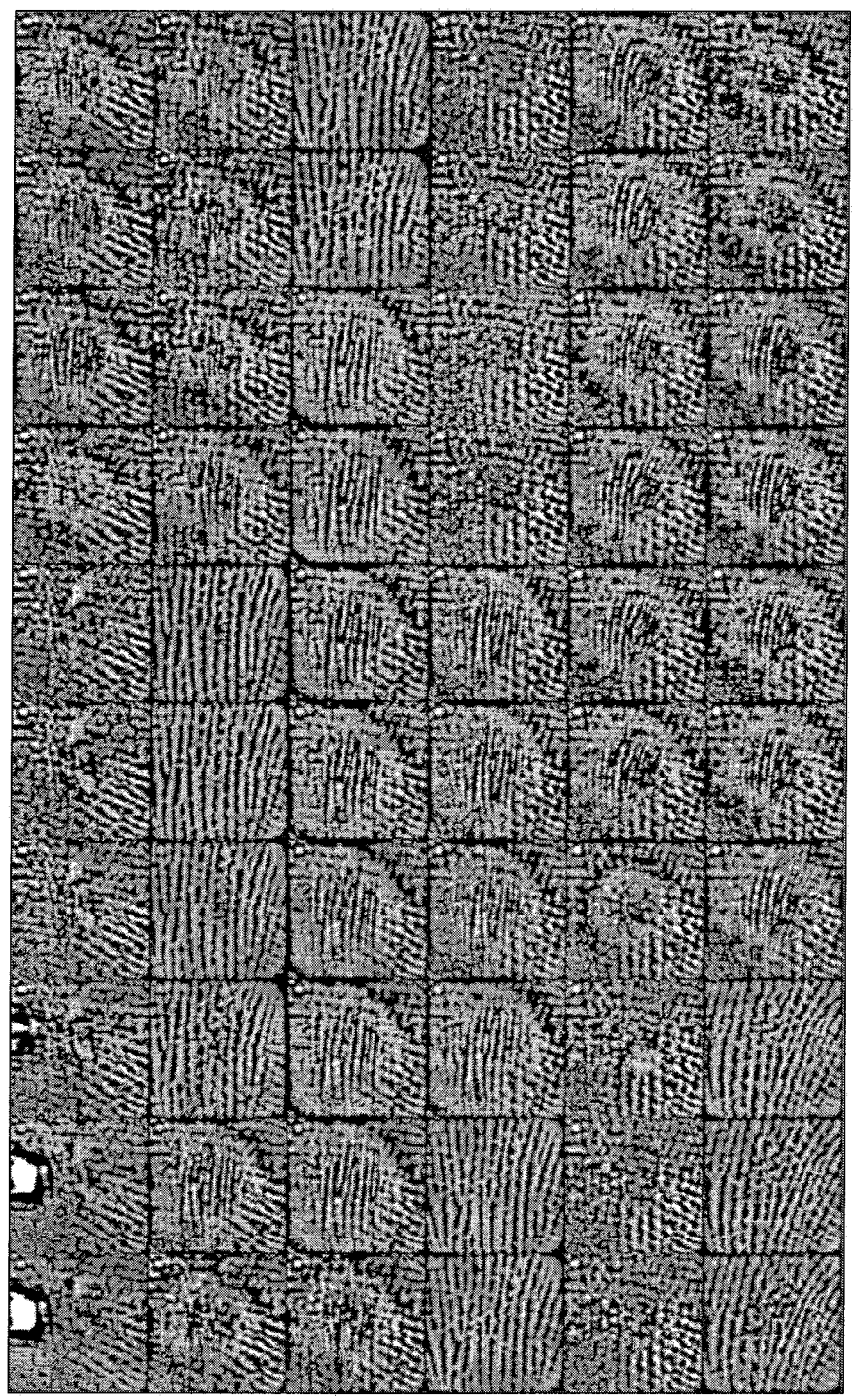
Figure 21C:
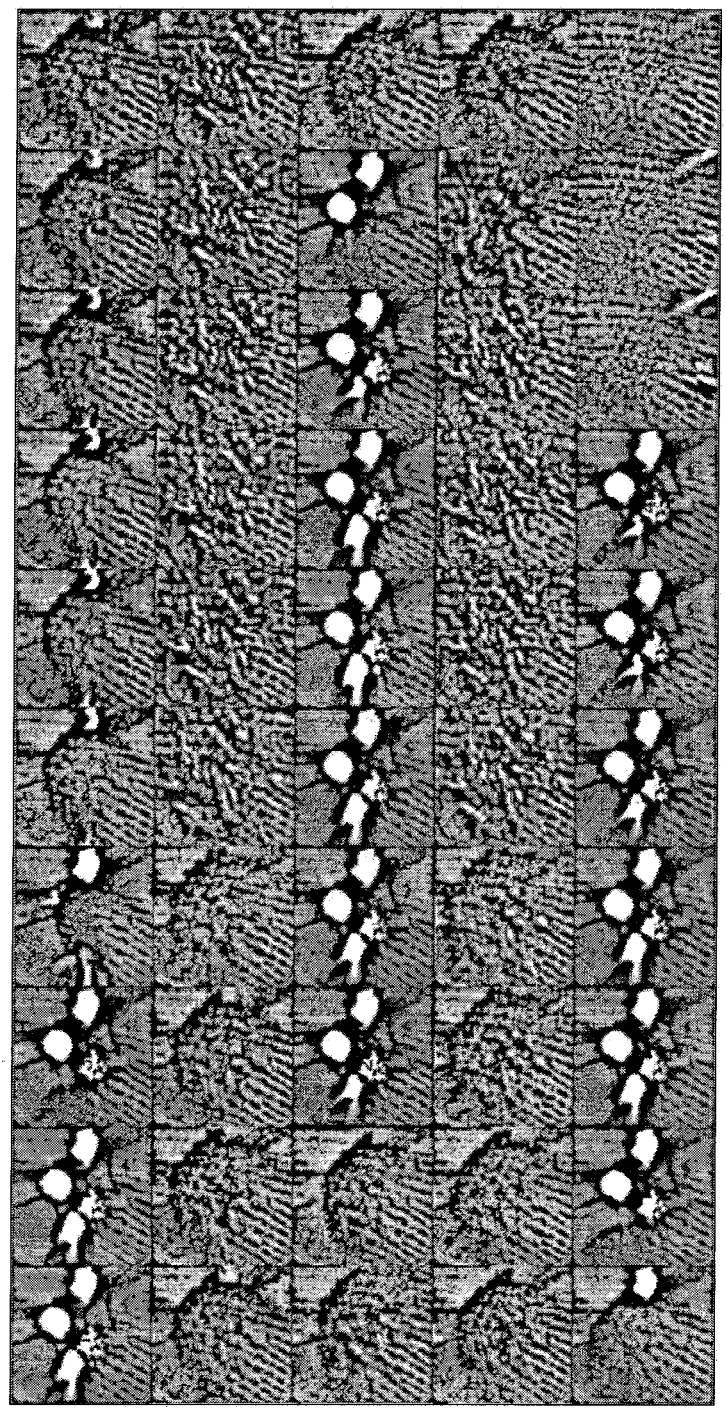

Referring to FIGS. 21A, 21B and 21C, images that are continuously captured before and after an image including an object may be obtained. FIGS. 21A and 21C illustrate images captured indoors, and FIG. 21B illustrates images captured outdoors. FIGS. 21A and 21B illustrate cases where a finger of a user is directly used, and FIG. 21C illustrate a case where a finger wearing a glove is used.

For example, in an image sequence (or an order of images) when continuously capturing images with the half-shutter and full-shutter inputs, an image contaminated by an external light source may be captured first. Next, as a finger approaches the panel, the external light source may be blocked or obscured by the finger, and an image where the finger is separated from the panel by a certain distance may be captured. Subsequently, an image including the finger (e.g., a fingerprint) may be captured. After then, as the finger moves away, the image where the finger is separated from the panel by a certain distance may be captured again. Finally, the image contaminated by the external light source may be captured again. In an environment without the external light source, there may be no images contaminated by the external light source.

In FIG. 21A, there may be 40 images from No. 1 to No. 40. The images of FIG. 21A may be captured by changing the finger of the user and a location of the device in an indoor environment where a number of external light sources exist. In FIG. 21A, images from No. 1 to No. 10 are arranged on a first row in a left to right direction (that is, an image of No. 1 being the furthest left position and an image of No. 10 being the furthest right position in the first row), images from No. 11 to No. 20 are arranged on a second row (an image of No. 11 being the furthest left position and an image of No. 20 being the furthest right position in the second row), images from No. 21 to No. 30 are arranged on a third row (an image of No. 21 being the furthest left position and an image of No. 30 being the furthest right position in the third row), and images from No. 31 to No. 40 are arranged on a fourth row (an image of No. 31 being the furthest left position and an image of No. 40 being the furthest right position in the fourth row).

Images of Nos. 1 to 8 may represent images contaminated by the external light sources, images of Nos. 9 to 14 may represent images in which the finger approaches the shutter button in preparation for the image capturing, images of Nos. 15 to 18 may represent images in which the shutter button is touched, images of Nos. 19 to 26 may represent images in which the finger moves away after touching (e.g., after the image capturing), and images of Nos. 27 to 40 may represent images contaminated by the external light sources. A portion indicated by a red box including the images of Nos. 12 to 18 may represent the half-shutter state or the full-shutter state recognized according to example embodiments.

In FIG. 21B, there may be 60 images from No. 1 to No. 60, each 10 images being arranged in a first row through a sixth row, and an image number increases in a left to right direction, similar to FIG. 21A. Images of Nos. 1 to 7 may represent images in which the finger does not approach the panel, images of Nos. 8 to 13 may represent images in which the finger approaches the panel, images of Nos. 14 to 16 may represent images in which the shutter button is touched, images of Nos. 17 to 36 may represent images in which the finger moves away after touching, images of Nos. 37 to 44 may represent images in which the finger does not approach the panel, images of Nos. 45 to 58 may represent images in which the finger approaches the panel again, and images of Nos. 59 to 60 may represent images in which the finger does not approach the panel. A portion indicated by a red box including the images of Nos. 8 to 13, 17 to 26 and 45 to 58 may represent the half-shutter state recognized according to example embodiments.

In FIG. 21C, there may be 50 images from No. 1 to No. 50, each 10 images being arranged in a first row through a fifth row, and an image number increases in a left to right direction, similar to FIG. 21A. Images of Nos. 1 to 3, 23 to 29 and 41 to 47 may represent contaminated images, images of Nos. 4 to 14, 21 to 22, 30 to 34, 40 and 48 to 50 may represent images immediately before or after the touch input, and images of Nos. 15 to 20 and 35 to 39 may represent images with the touch input. A portion indicated by a red box including the images of Nos. 4 to 12, 21 to 22, 30, 40 and 48 to 50 may represent the half-shutter state or the full-shutter state recognized according to example embodiments. A fabric pattern of the glove may be captured instead of the fingerprint during the touch input.

Figure 22:
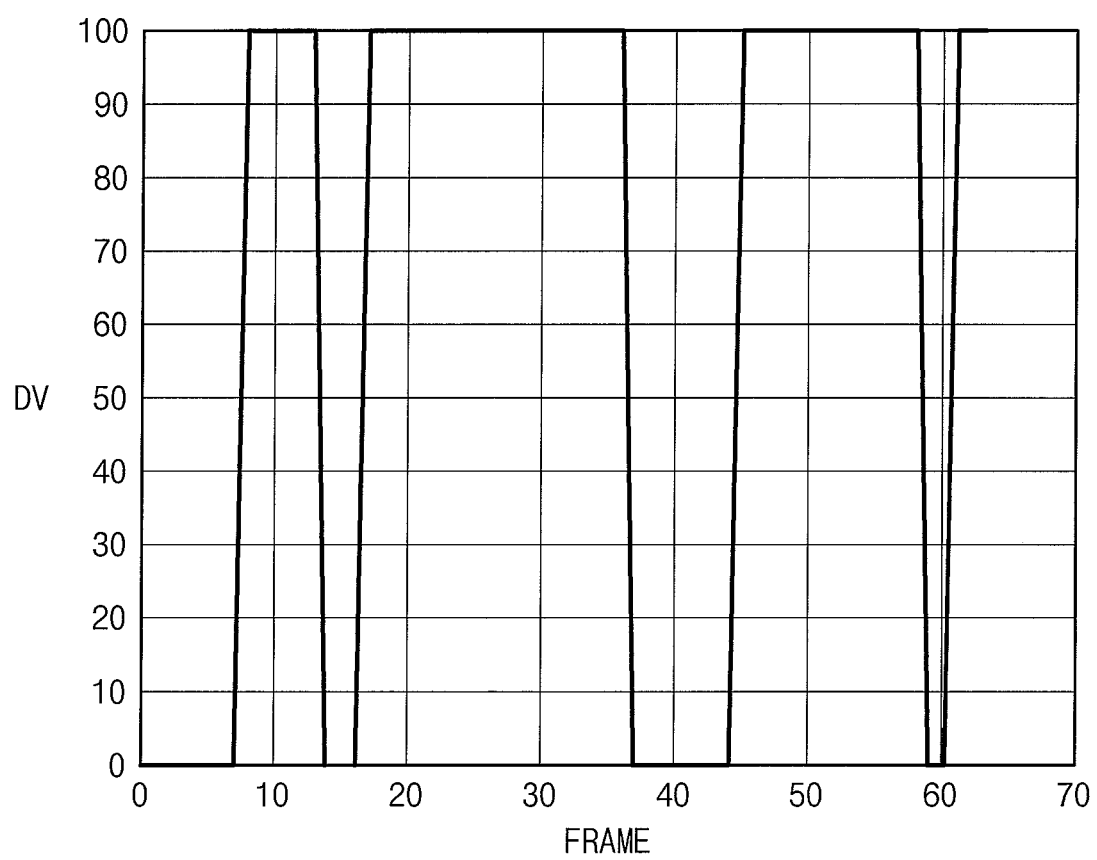

Referring to FIG. 22, a result of identifying the half-shutter state based on the method of performing the half-shutter function according to example embodiments is illustrated. In FIG. 22, a horizontal axis FRAME represents a frame number of images, and a vertical axis DV represents a result of determination. The half-shutter status as a result of determined may be represented as a value of 100, and the images of Nos. 8 to 13, 17 to 36 and 45 to 58 having a value of 100 may be identified as images having the half-shutter state.

As will be appreciated by those skilled in the art, the inventive concept may be embodied as a system, a method, a computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain or store a program for use by or in connection with an instruction execution system, apparatus, or device. For example, the computer readable medium may be a non-transitory computer readable medium.

FIG. 23 is a block diagram illustrating an electronic device according to example embodiments.

Referring to FIG. 23, an electronic device 1000 may include a processor 1010, a memory device 1020, an object recognition sensor 1030, an input/output (I/O) device 1040, a power supply 1050 and a display device 1060. The electronic device 1000 may further include a plurality of ports for communicating a video card, a sound card, a memory card, a universal serial bus (USB) device, other electronic devices, etc.

The processor 1010 controls operations of the electronic device 1000. The processor 1010 may execute an operating system and at least one application to provide an internet browser, games, videos, or the like. The memory device 1020 may store data for the operations of the electronic device 1000. The I/O device 1040 may include an input device such as a camera, a keyboard, a keypad, a mouse, a touchpad, a touch-screen, a remote controller, etc., and an output device such as a printer, a speaker, a display, etc. The power supply 1050 may provide a power for the operations of the electronic device 1000.

The display device 1060 includes a display panel. The display panel, the object recognition sensor 1030, the processor 1010 and the memory device 1020 in FIG. 23 may correspond to the display panel 111, the object recognition sensor 130, the processor 140 and the memory 150 in FIG. 4, respectively, and may perform the method of performing the half-shutter function according to example embodiments and the method of capturing the image according to example embodiments.

In the method of performing the half-shutter function using the optical object recognition, and the method of capturing the image according to example embodiments, the half-shutter input for performing the half-shutter process may be provided or identified by detecting a situation before pressing the shutter button based on the object recognition sensor and the optical object recognition and by recognizing the situation as the half-shutter state. Accordingly, the half-shutter input may be efficiently identified without a physical shutter button, and the zero shutter lag may be efficiently achieved with low power consumption by performing various functions before taking an image, without reducing the size of the display in the electronic device and increasing the thickness of the electronic device.

The inventive concept may be applied to various electronic devices and systems that include the display panels and the object recognition sensors and perform the half-shutter function when capturing the images. For example, the inventive concept may be applied to systems such as a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of performing a half-shutter function using optical object recognition, the method comprising:
    displaying a shutter button on a display panel by driving a portion of a plurality of light sources included in the display panel, the portion of the plurality of light sources being disposed corresponding to an object recognition window of the display panel;
    obtaining a first image based on reflected light received by an object recognition sensor through the object recognition window while driving the portion of the plurality of light sources;
    determining whether the first image includes a first object, the first object having a half-shutter state, based on a blur in the first image indicating that the first object is spaced apart from the object recognition window by a predetermined distance or less; and
    based on a determination that the first image includes the first object having the half-shutter state, performing a half-shutter process.

2. The method of claim 1, wherein
    the half-shutter state indicates an input for performing the half-shutter process associated with an image capturing, prior to performing the image capturing.

3. The method of claim 2, wherein the half-shutter process includes at least one of a focus adjustment, an exposure adjustment, a white balance adjustment, a gain adjustment, a low power consumption, and a control for a continuous image capturing.

4. The method of claim 1, wherein the determining whether the first image includes the first object comprises:
    obtaining a first value by performing a spatial signal processing on the first image; and
    determining whether the first image includes the first object based on the first value and a predetermined first threshold value.

5. The method of claim 4, wherein the determining whether the first image includes the first object further comprises:
    obtaining a second value by performing a frequency signal processing on the first image; and
    determining whether the first object in the first image has the half-shutter state based on the second value and a predetermined second threshold value.

6. The method of claim 5, wherein the determining whether the first image includes the first object further comprises:
    detecting a first key region in the first image, and
    wherein the spatial signal processing and the frequency signal processing are performed only on the first key region.

7. The method of claim 1, wherein the determining whether the first image includes the first object comprises:
    obtaining a first value by performing a first frequency signal processing on the first image; and
    determining whether the first image includes the first object based on the first value and a predetermined first threshold value.

8. The method of claim 7, wherein the determining whether the first image includes the first object further comprises:
    obtaining a second value by performing a second frequency signal processing on the first image; and determining whether the first object in the first image has the half-shutter state based on the second value and a predetermined second threshold value.

9. The method of claim 1, wherein the determining whether the first image includes the first object comprises:
obtaining a first value by performing only one frequency signal processing on the first image; and
determining whether the first image includes the first object based on the first value and a predetermined first threshold value.

10. The method of claim 9, wherein the determining whether the first image includes the first object further comprises:
determining whether the first object in the first image has the half-shutter state based on the first value and a predetermined second threshold value.

11. The method of claim 1, further comprising:
determining whether a full-shutter input is received,
wherein the determining whether the first image includes the first object having the half-shutter state is performed when it is determined that the full-shutter input is not received.

12. The method of claim 11, wherein the full-shutter input is provided through a touch sensor panel.

13. The method of claim 1, further comprising:
obtaining a first comparison image based on the first image and at least one second image that is pre-stored,
wherein the determining whether the first image includes the first object having the half-shutter state is performed based on the first comparison image.

14. The method of claim 13, wherein:
a plurality of images including the first image are continuously obtained based on the reflected light received by the object recognition sensor through the object recognition window, and
the at least one second image is an image obtained before the first image among the plurality of images.

15. The method of claim 1, wherein the first object includes a finger of a user.

16. A method of capturing an image, the method comprising:
displaying a shutter button on a display panel by driving a portion of a plurality of light sources included in the display panel, the portion of the plurality of light sources being disposed to correspond to an object recognition window of the display panel;
continuously obtaining a plurality of images based on reflected light received by an object recognition sensor through the object recognition window while driving the portion of the plurality of light sources;
performing a half-shutter function based on a half-shutter input, the half-shutter input being detected based on a first image among the plurality of images; and
performing an image capturing function based on a full-shutter input,
wherein the performing the half-shutter function includes:
determining whether the first image includes a first object, the first object having a half-shutter state, based on a blur in the first image indicating that the first object is spaced apart from the object recognition window by a predetermined distance or less; and
performing a half-shutter process based on the half-shutter state of the first object included in the first image.

17. The method of claim 16, wherein the full-shutter input is detected based on a second image obtained after the first image among the plurality of images.

18. The method of claim 16, wherein the full-shutter input is detected based on a touch input of a user received through a touch sensor panel.

19. The method of claim 16, further comprising:
executing an image capturing application providing the image capturing function.

20. A method of performing a half-shutter function using optical object recognition, the method comprising:
executing and displaying, on a display panel, an image capturing application providing an image capturing function, the display panel including a plurality of light sources;
displaying a shutter button on the display panel by driving a portion of the plurality of light sources, the portion of the plurality of light sources being disposed to correspond to an object recognition window of the display panel;
prior to receiving a full-shutter input, continuously obtaining a plurality of images based on reflected light received by an object recognition sensor through the object recognition window while driving the portion of the plurality of light sources;
determining that a first image among the plurality of images includes a first object having a half-shutter state, based on a blur in the first image indicating that the first object is spaced apart from the object recognition window by a predetermined distance or less; and
performing a half-shutter process based on the half-shutter state of the first object included in the first image,
wherein it is determined that the first image includes the first object having the half-shutter state based on a result of performing at least one of a spatial signal processing and a frequency signal processing on the first image.

* * * * *